United States Patent
Kwon et al.

(10) Patent No.: US 10,372,896 B2
(45) Date of Patent: Aug. 6, 2019

(54) PATTERN INPUT APPARATUS AND METHOD, AND RECORDING MEDIUM USING THE SAME

(71) Applicant: INDUSTRY-ACADEMIC COOPERATION FOUNDATION, YONSEI UNIVERSITY, Seoul (KR)

(72) Inventors: Tae Kyoung Kwon, Seoul (KR); Sa Rang Na, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 400 days.

(21) Appl. No.: 15/033,026

(22) PCT Filed: Oct. 8, 2014

(86) PCT No.: PCT/KR2014/009486
§ 371 (c)(1),
(2) Date: Apr. 28, 2016

(87) PCT Pub. No.: WO2015/064925
PCT Pub. Date: May 7, 2015

(65) Prior Publication Data
US 2016/0283710 A1    Sep. 29, 2016

(30) Foreign Application Priority Data

Oct. 30, 2013 (KR) .......... 10-2013-0129817

(51) Int. Cl.
*G06F 21/36* (2013.01)
*G06F 3/0488* (2013.01)
(Continued)

(52) U.S. Cl.
CPC .......... *G06F 21/36* (2013.01); *G06F 3/04883* (2013.01); *G06F 3/04886* (2013.01);
(Continued)

(58) Field of Classification Search
CPC .. G06F 21/36; G06F 3/04883; G06F 3/04886; G06F 21/32
See application file for complete search history.

(56) References Cited

U.S. PATENT DOCUMENTS

| | | | |
|---|---|---|---|
| 2011/0080260 A1* | 4/2011 | Wang .................. | G06F 21/32 340/5.83 |
| 2011/0234524 A1 | 9/2011 | Longe et al. | |

(Continued)

FOREIGN PATENT DOCUMENTS

| | | |
|---|---|---|
| KR | 10-2010-0026219 A | 3/2010 |
| KR | 10-2012-0108715 A | 10/2012 |
| KR | 10-2013-0037596 A | 4/2013 |

OTHER PUBLICATIONS

KR 10-2010-0026219 translated to English (Year: 2010).*
(Continued)

*Primary Examiner* — Saleh Najjar
*Assistant Examiner* — Devin E Almeida

(57) ABSTRACT

The present disclosure discloses a pattern input apparatus and a pattern input method for user authentication. According to the present disclosure, differently from the pattern function of the related art, the user does not directly input a pattern through a pattern lock interface, but inputs the pattern using a virtual manipulation interface which is separately provided. Therefore, it is strong to a smudge attack. The pattern input method of the present disclosure includes providing a virtual manipulation interface to input the pattern on the screen of the device to the user, separately from a pattern lock interface; and receiving the pattern through the virtual manipulation interface.

16 Claims, 31 Drawing Sheets

(51) Int. Cl.
*G06F 21/32* (2013.01)
*H04M 1/67* (2006.01)
*G06K 9/00* (2006.01)

(52) U.S. Cl.
CPC ........... *G06F 21/32* (2013.01); *G06K 9/0002* (2013.01); *G06K 9/00013* (2013.01); *G06K 9/00355* (2013.01); *H04M 1/67* (2013.01)

(56) References Cited

U.S. PATENT DOCUMENTS

| | | | | |
|---|---|---|---|---|
| 2012/0126940 A1* | 5/2012 | Coggill | ................... | G06F 21/32 340/5.54 |
| 2014/0366127 A1* | 12/2014 | DeLuca | ................... | G06F 21/36 726/19 |
| 2015/0089449 A1* | 3/2015 | Yeh | ................... | G06F 21/00 715/825 |
| 2015/0121510 A1* | 4/2015 | Gauteron | ................... | G06F 21/31 726/19 |
| 2015/0123925 A1* | 5/2015 | Qin | ................... | G06F 21/31 345/173 |

OTHER PUBLICATIONS

KR 10-2012-01008715 translated to English (Year: 2012).*
International Search Report for PCT/KR2014/009486 filed on Oct. 8, 2014.

* cited by examiner

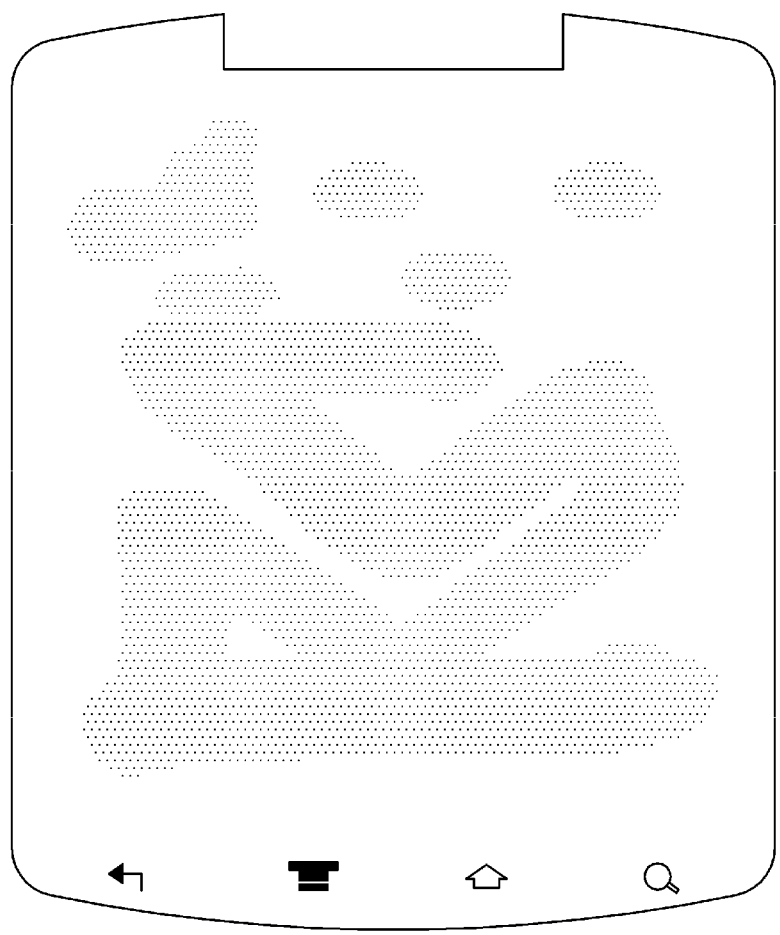
[FIG. 1]

[FIG. 2]
PATTERN INPUT APPARATUS(100)
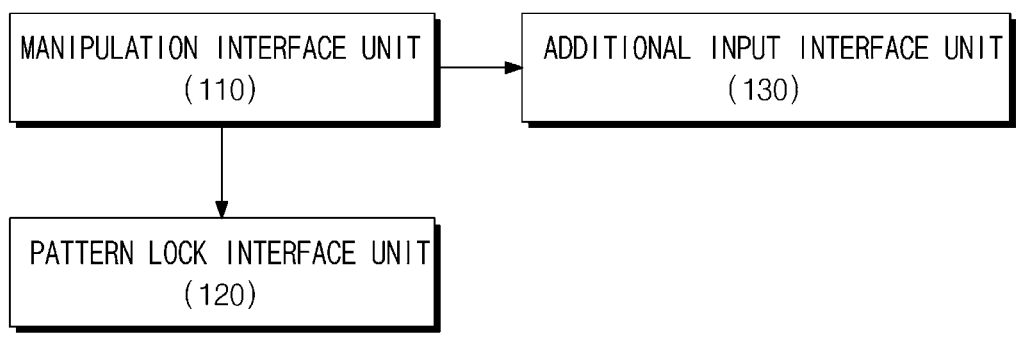

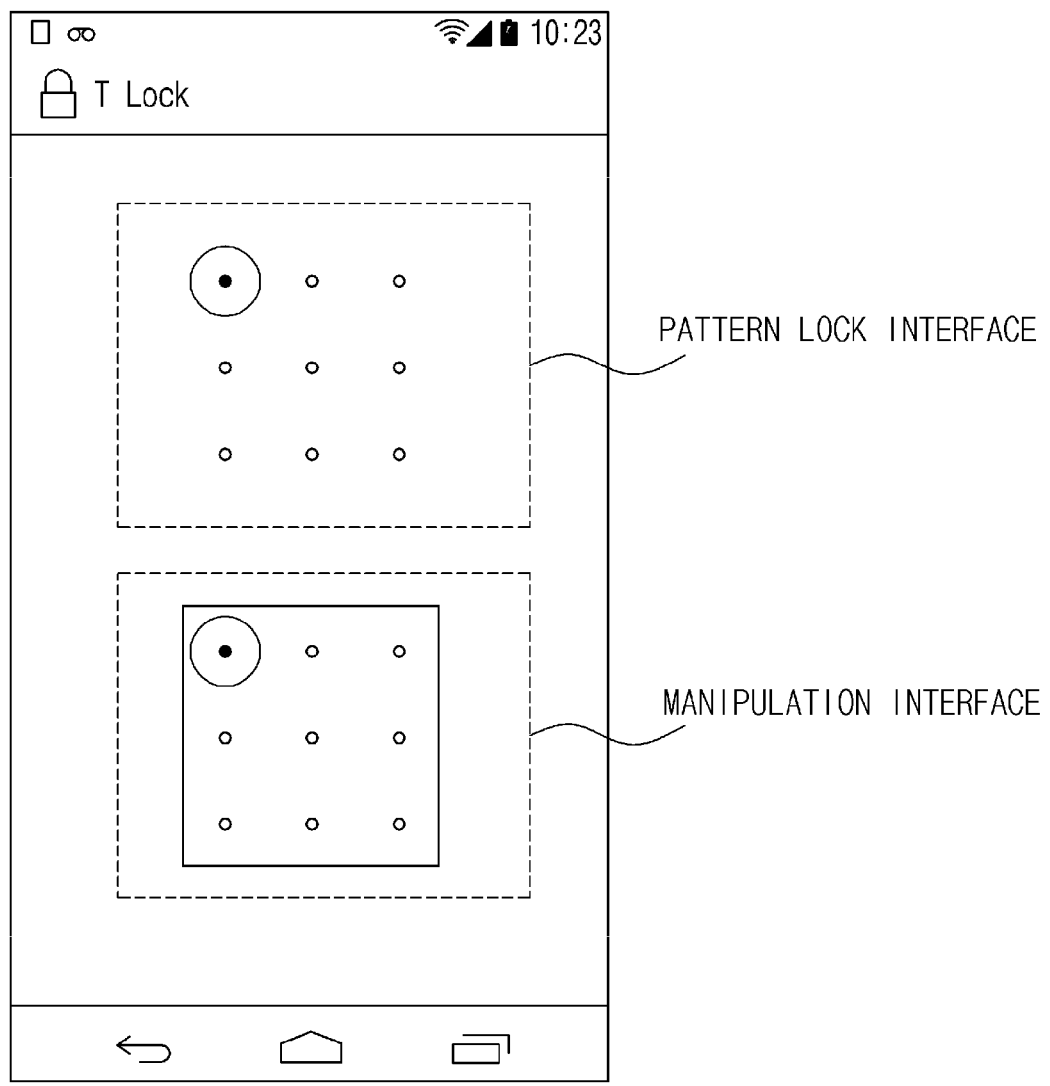

[FIG. 4]
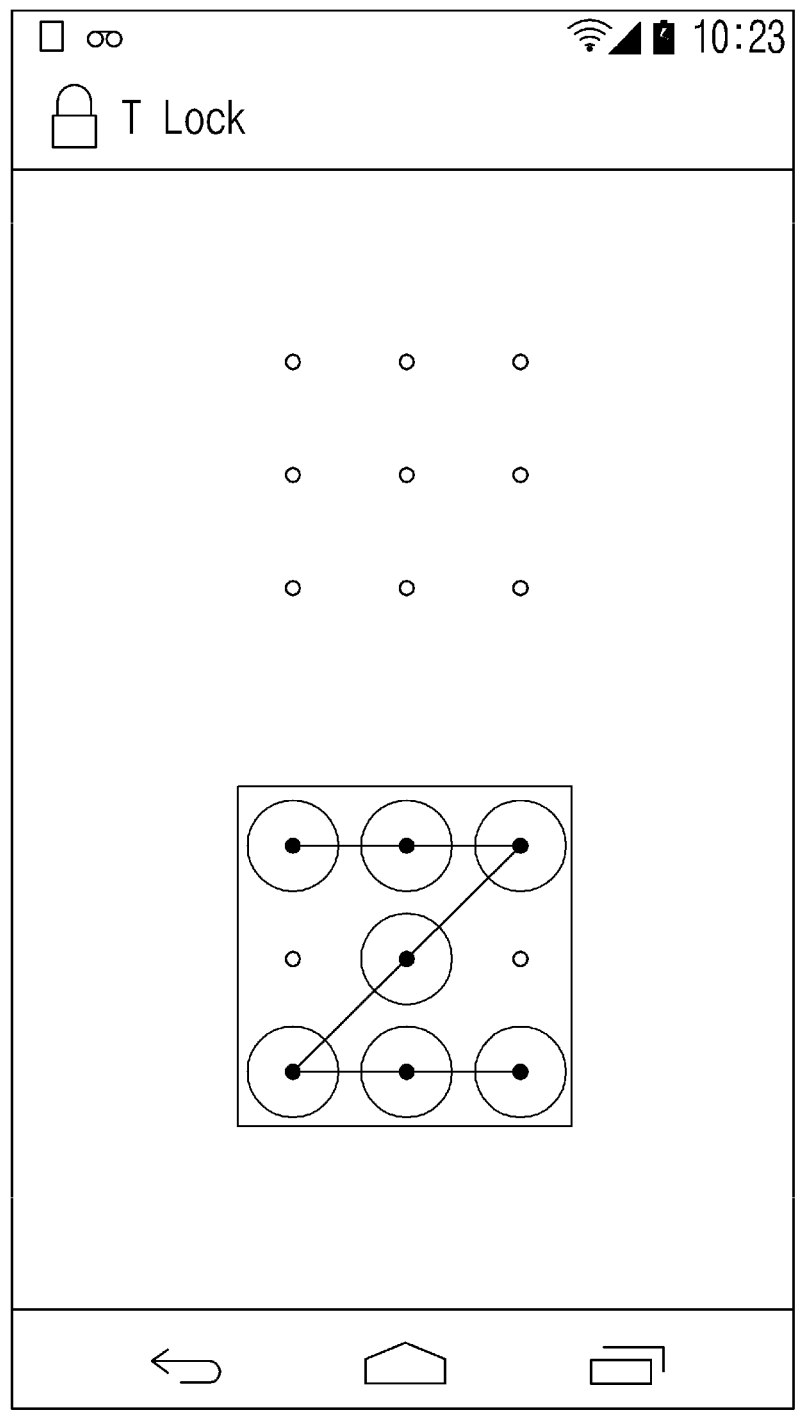

[FIG. 5]
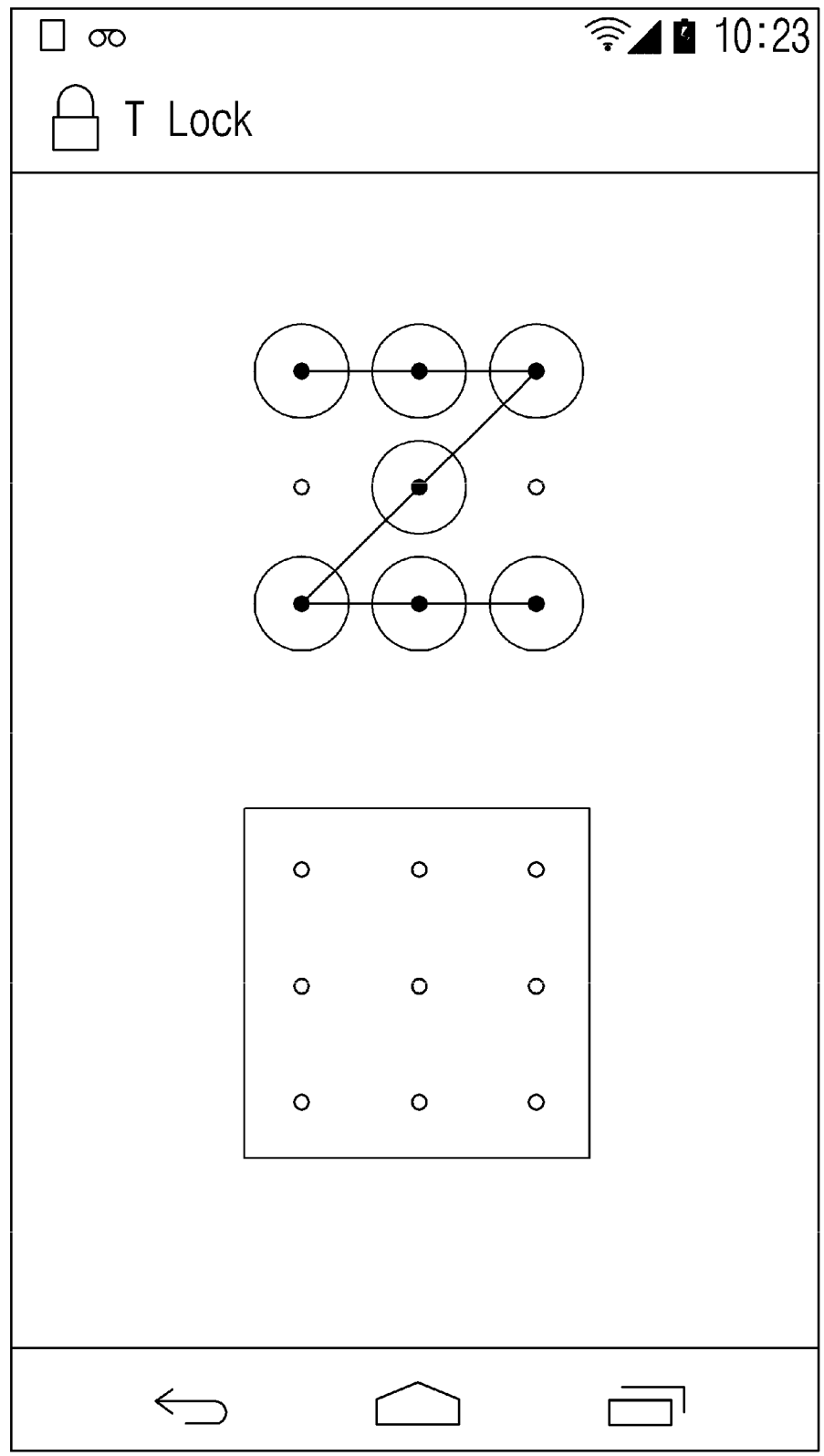

[FIG. 6A]
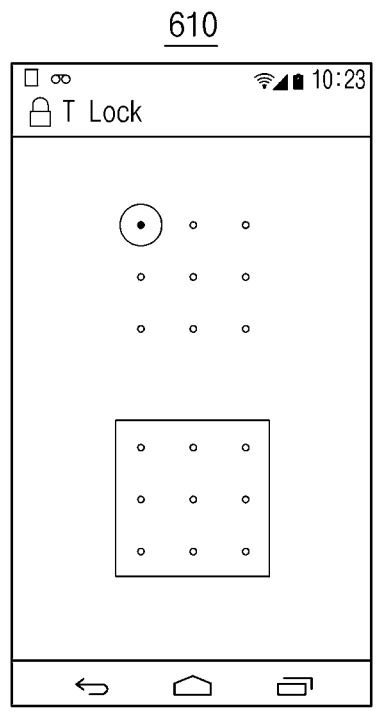
[FIG. 6B]
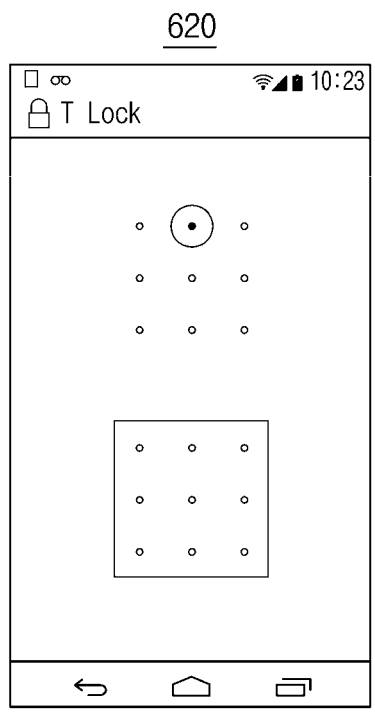

[FIG. 6C]
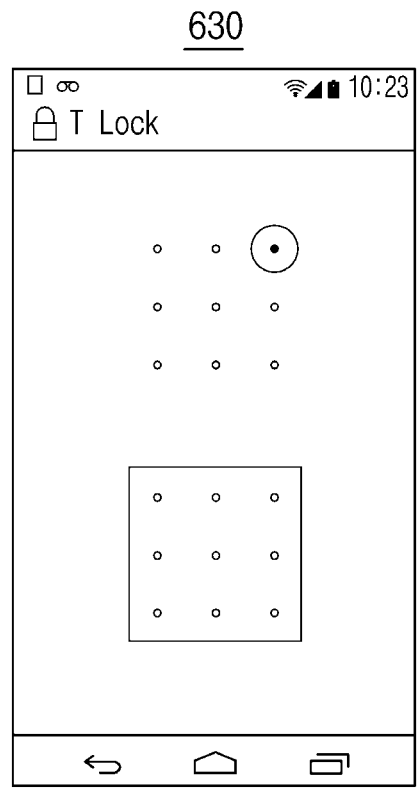
[FIG. 7A]
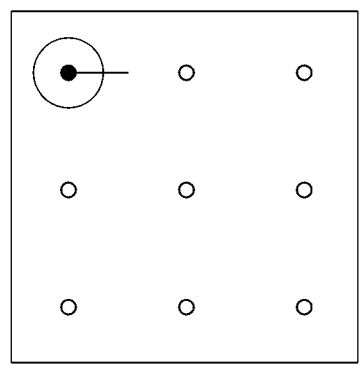

[FIG. 7B]
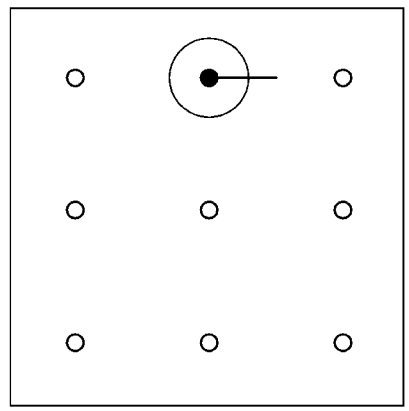
[FIG. 7C]
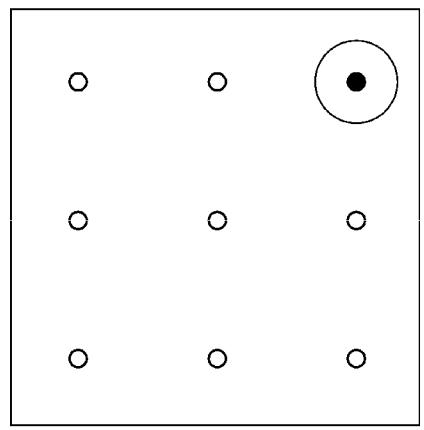
[FIG. 7D]
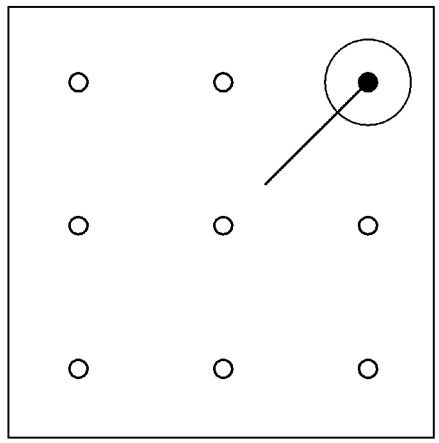

[FIG. 8]
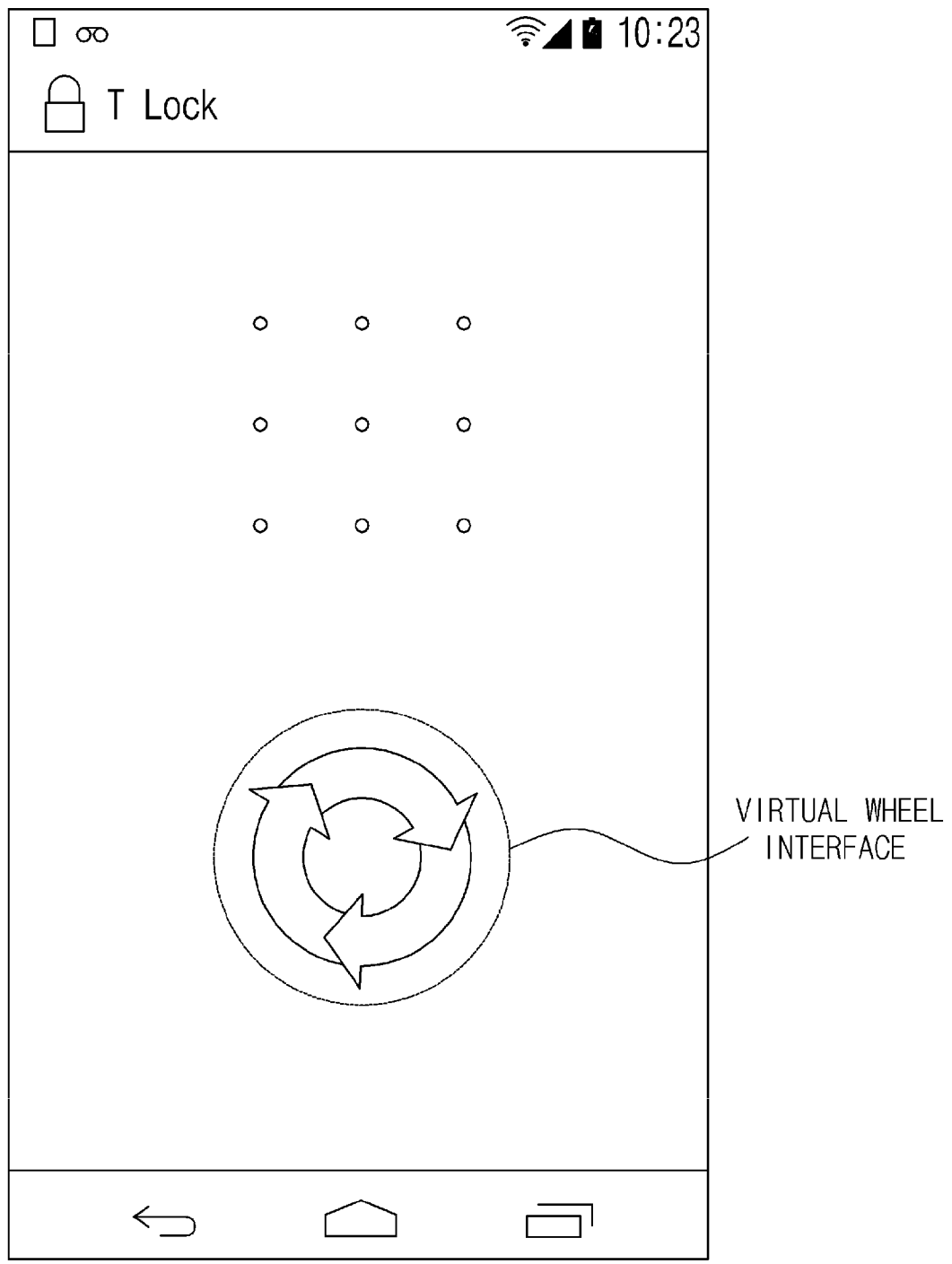

[FIG. 9A]
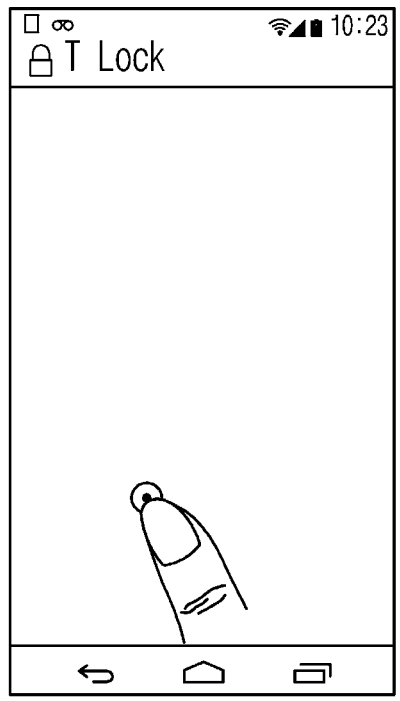
[FIG. 9B]
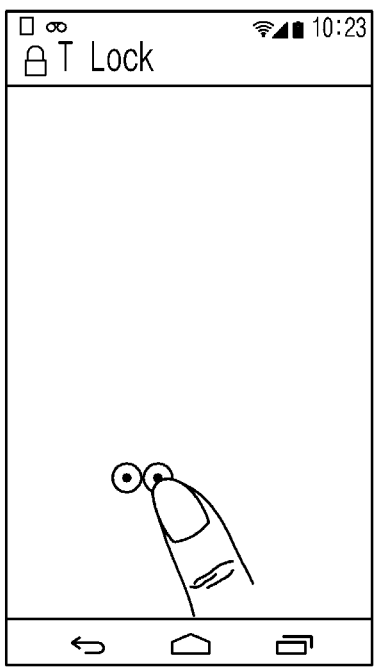

[FIG. 9C]
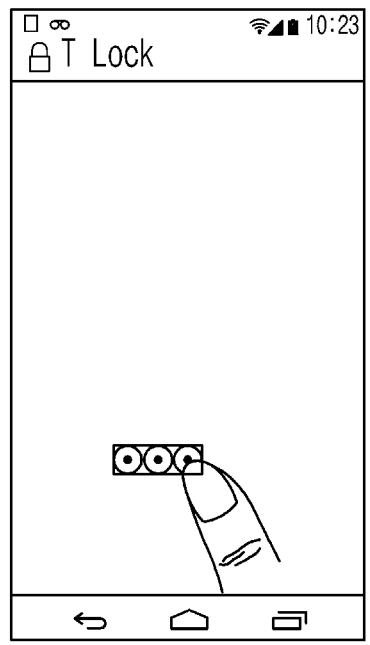
[FIG. 9D]
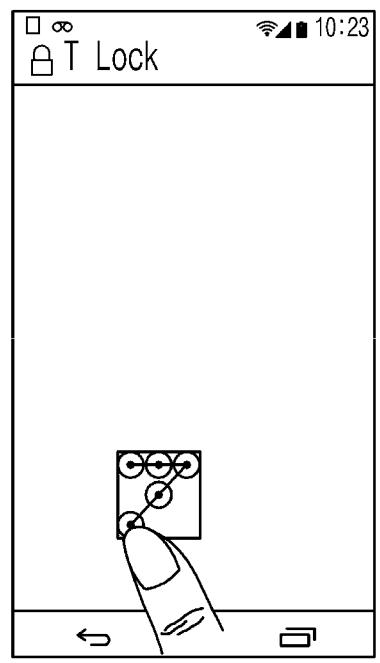

[FIG. 9E]
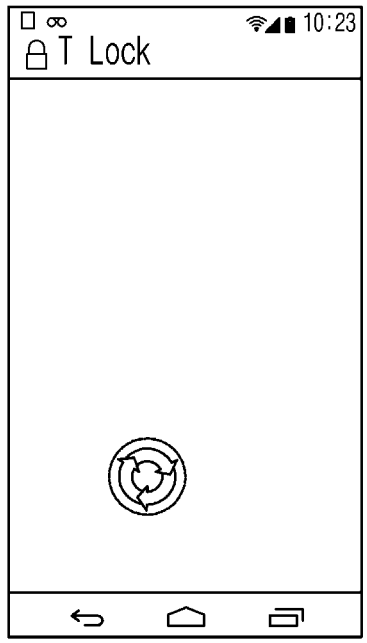
[FIG. 9F]
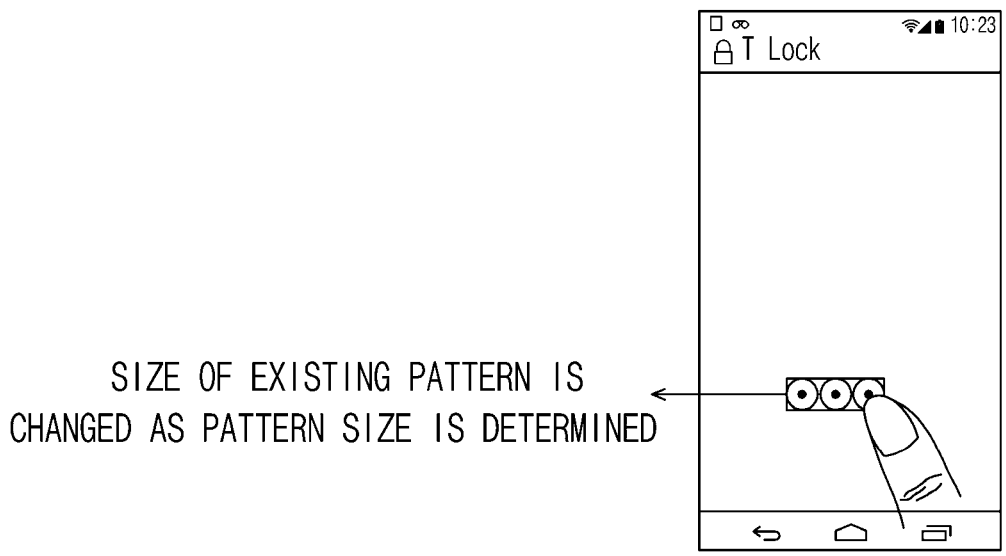
SIZE OF EXISTING PATTERN IS CHANGED AS PATTERN SIZE IS DETERMINED

[FIG. 9G]
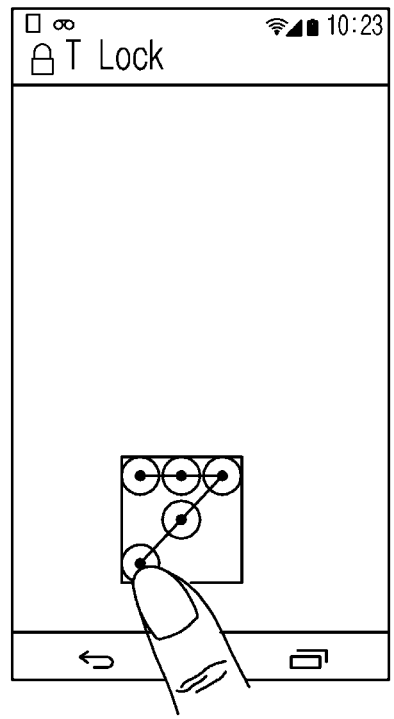
[FIG. 9H]
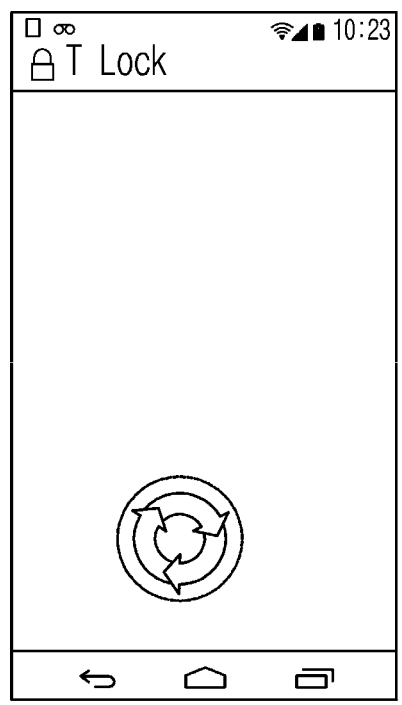

[FIG. 10A]
1010
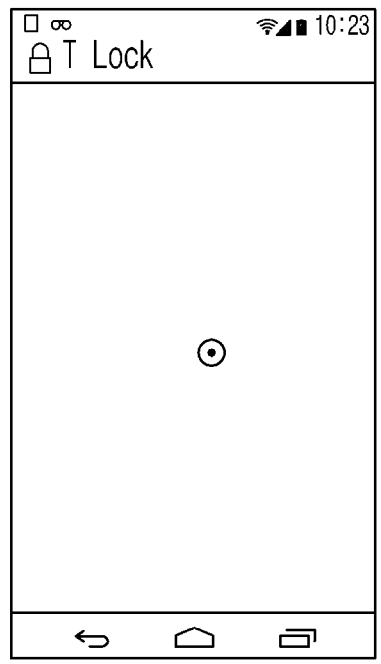
[FIG. 10B]
1020
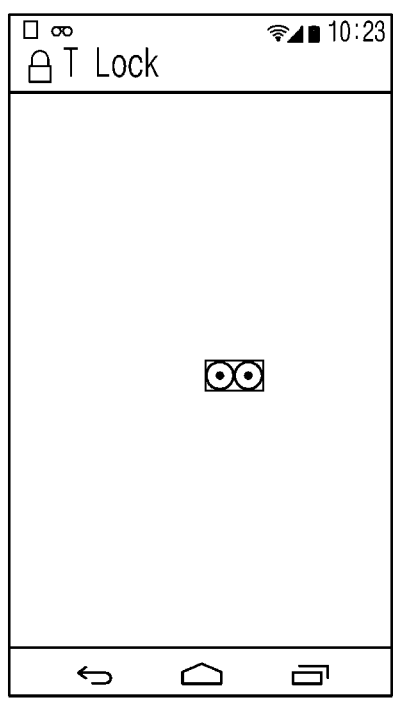

[FIG. 10C]
1030
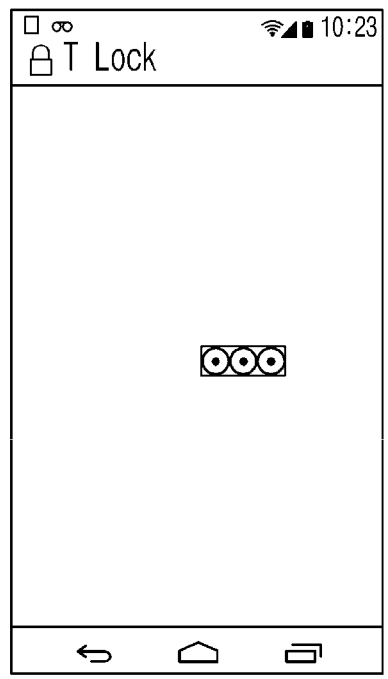
[FIG. 10D]
1040
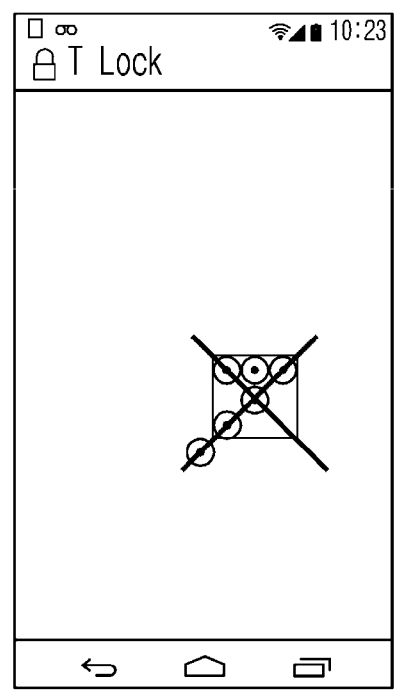

[FIG. 10E]
1050
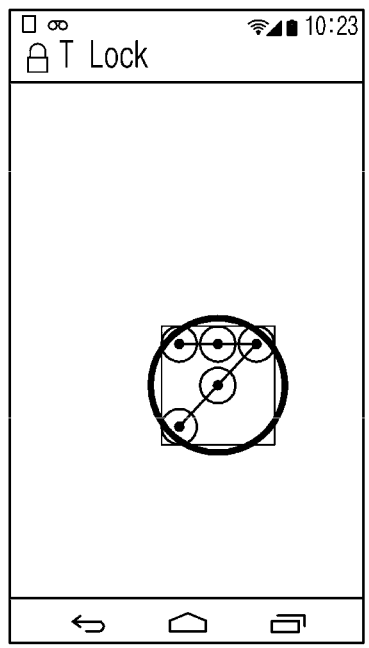
[FIG. 11A]
1110
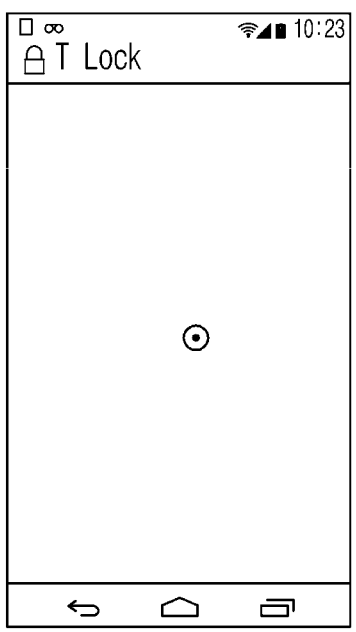

[FIG. 11B]
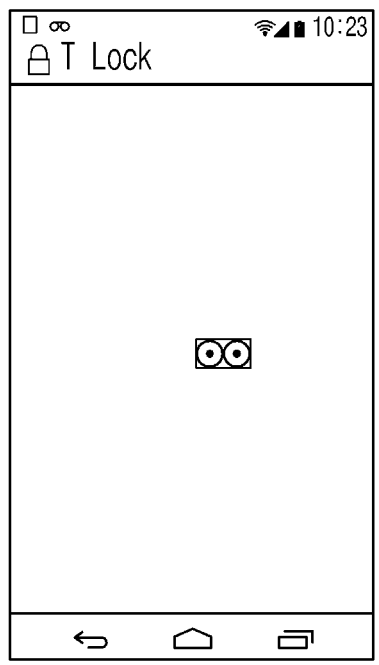
[FIG. 11C]
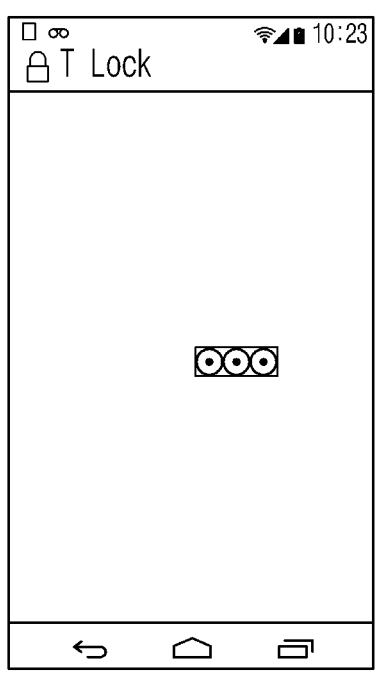

[FIG. 11D]
1140
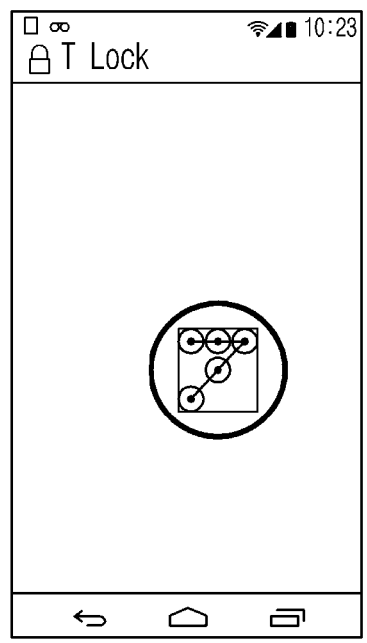
[FIG. 11E]
1150
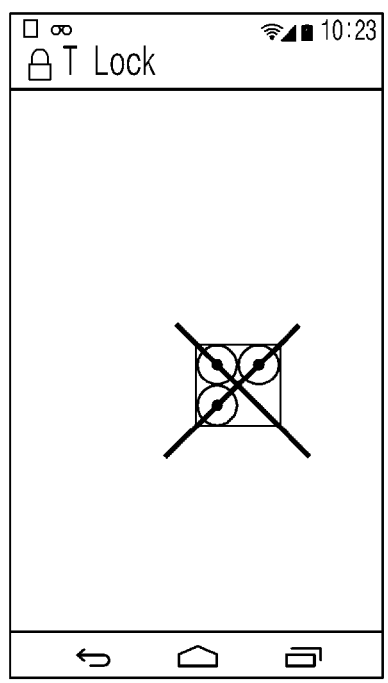

[FIG. 12A]
1210
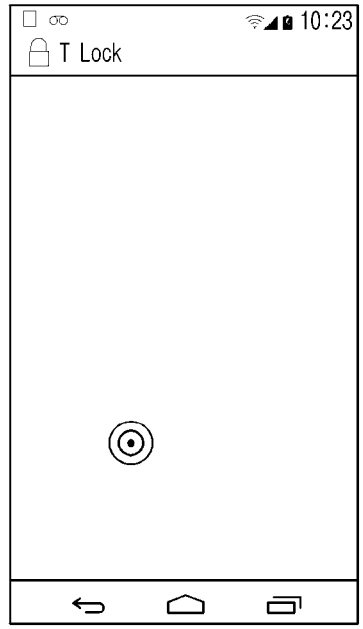
FINGER PRINT#1
[FIG. 12B]
1220
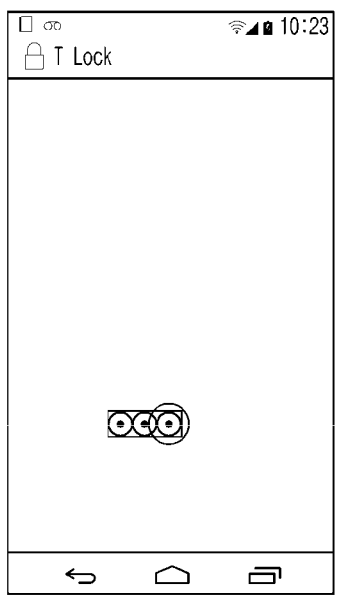
FINGER PRINT#2

[FIG. 12C]
1230
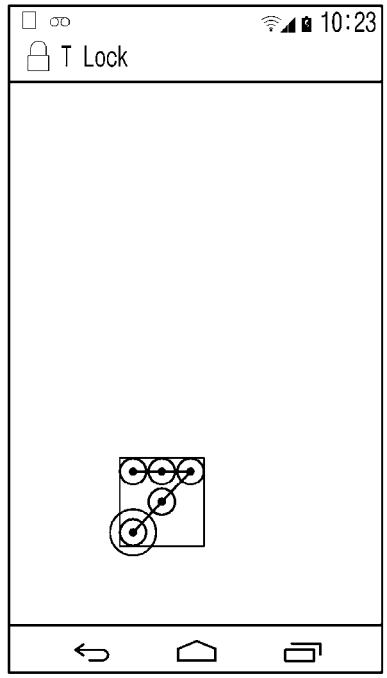
FINGER PRINT#3
[FIG. 12D]
1240
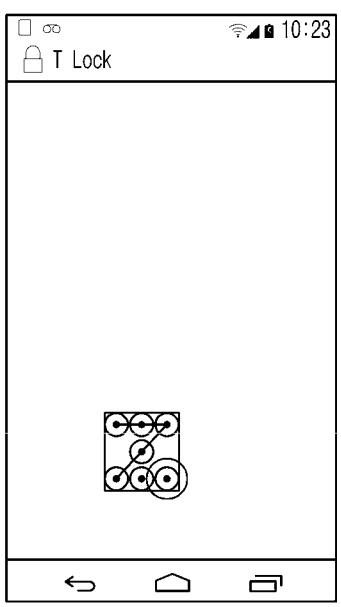
FINGER PRINT#4

[FIG. 13A]
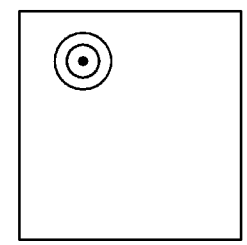
[FIG. 13B]
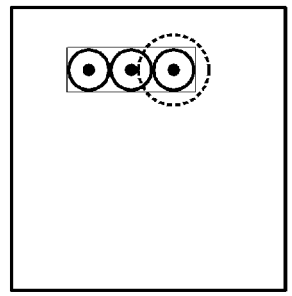

[FIG. 13C]
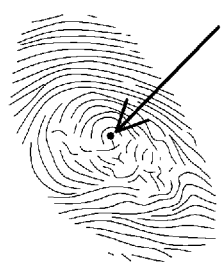
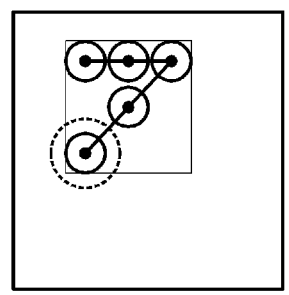
[FIG. 13D]
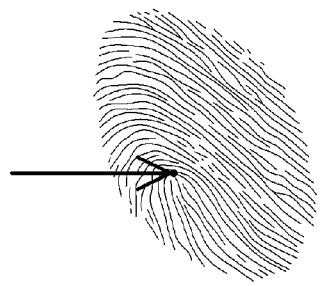
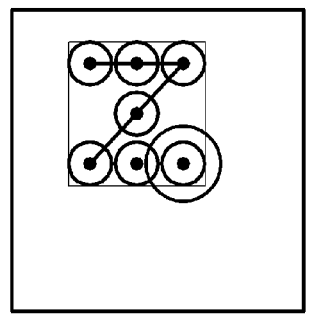

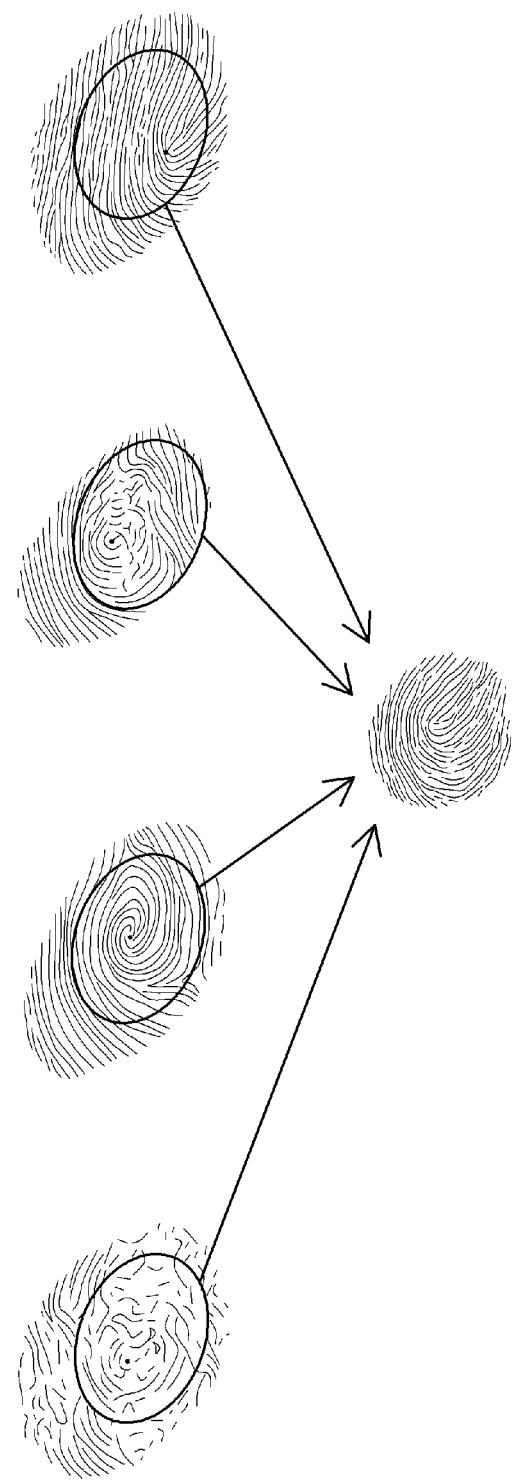
[FIG. 14]

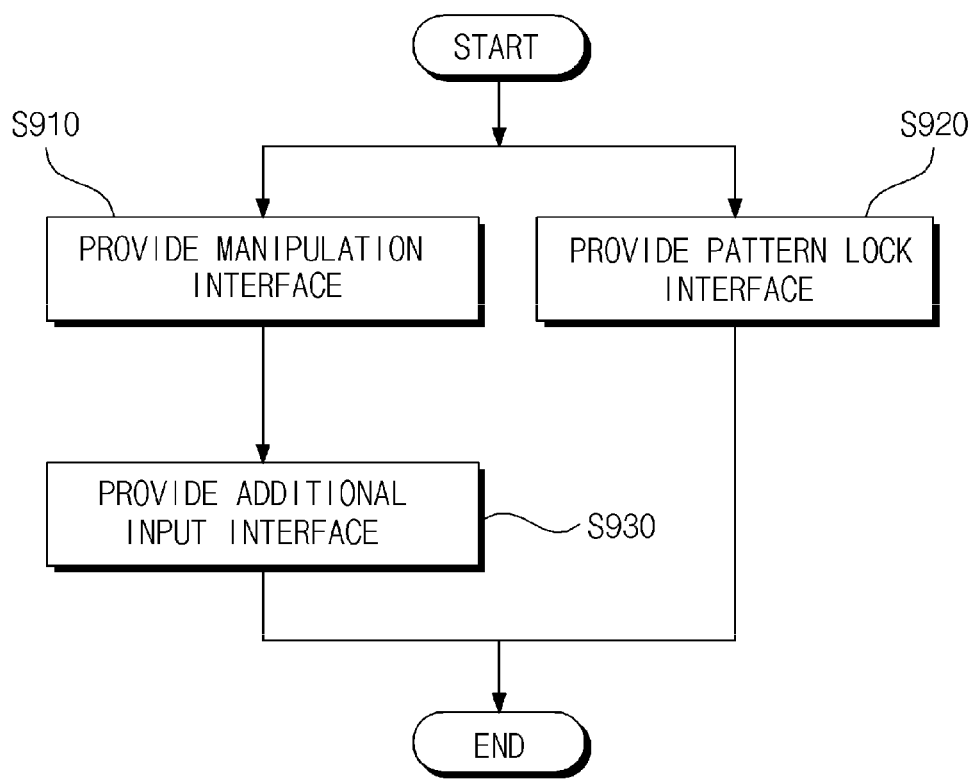
[FIG. 15]

[FIG. 16A]
1610
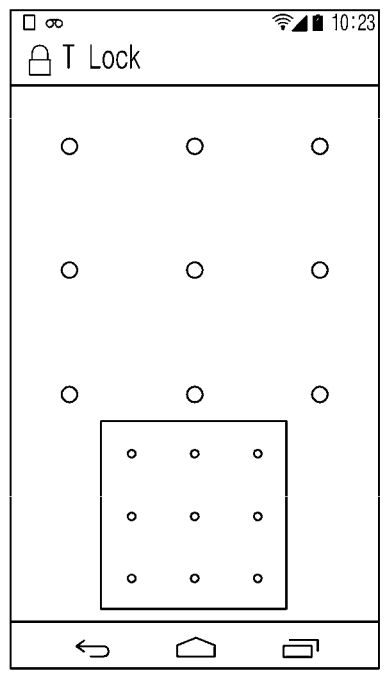
[FIG. 16B]
1620
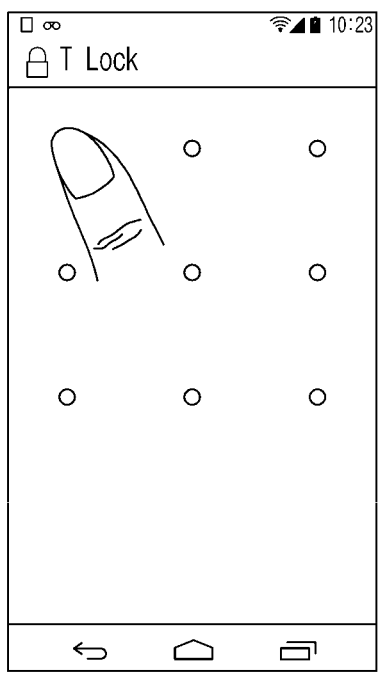

[FIG. 16C]
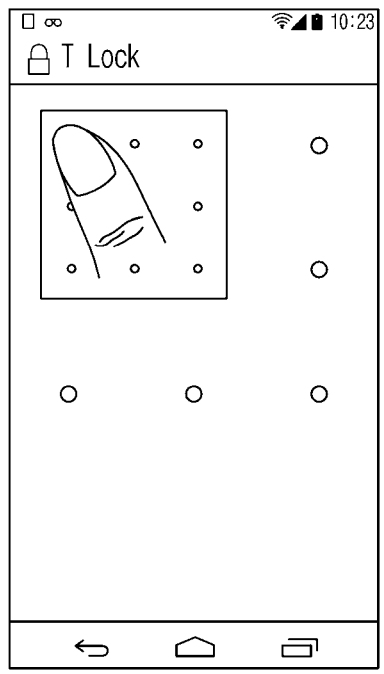
[FIG. 16D]
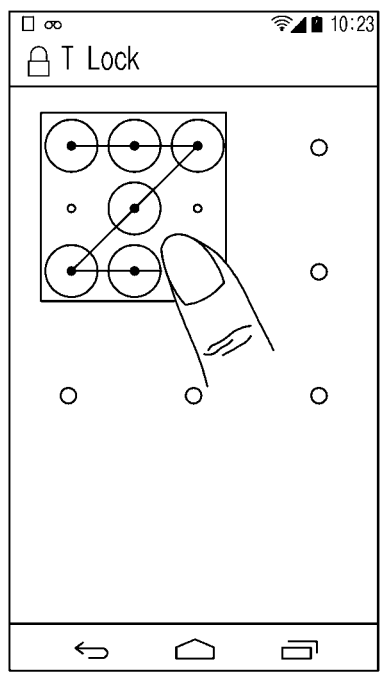

[FIG. 17A]
1710
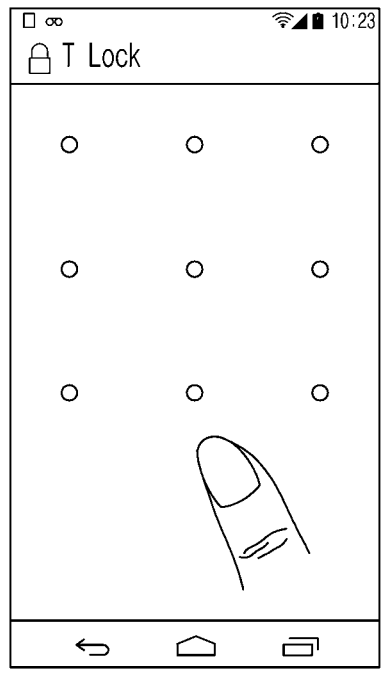
[FIG. 17B]
1720
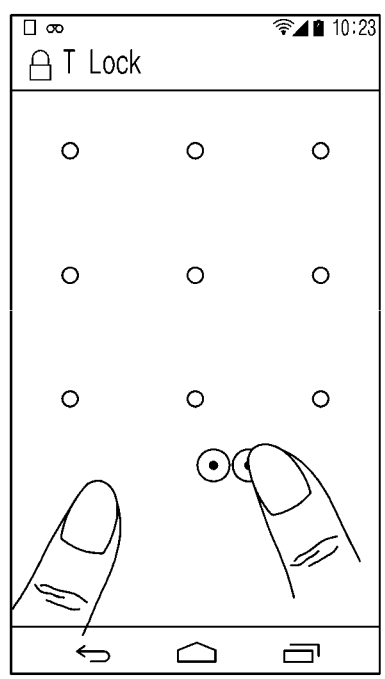

[FIG. 17C]
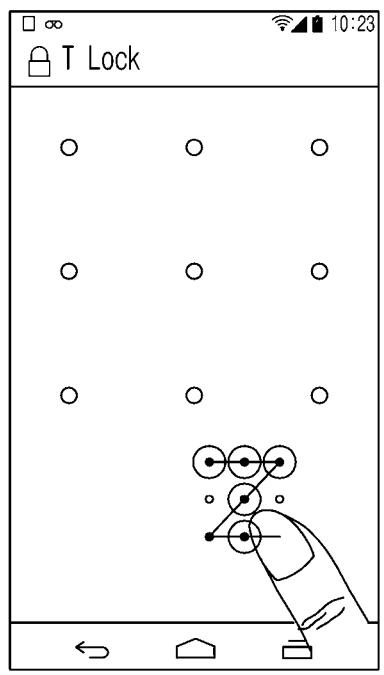
[FIG. 17D]
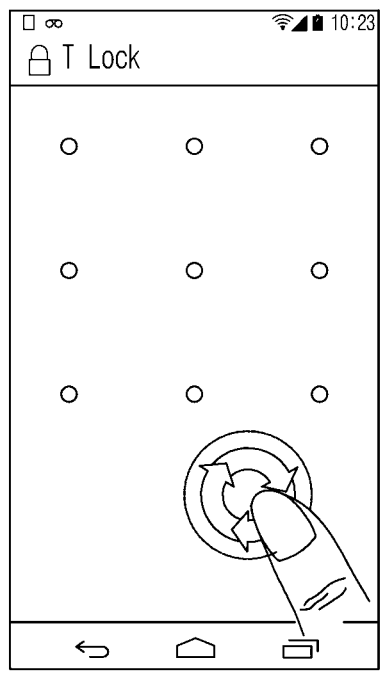

[FIG. 18A]
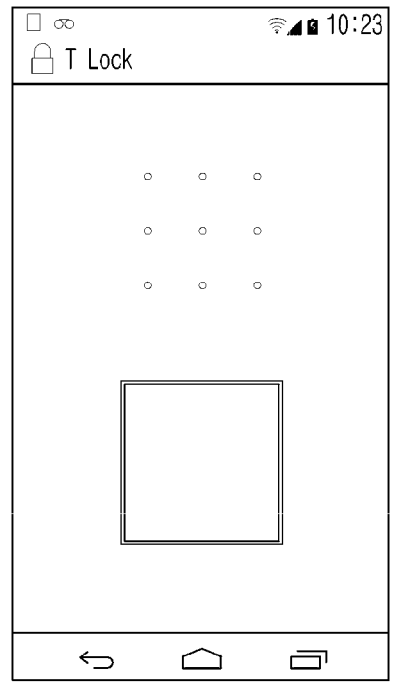
[FIG. 18B]
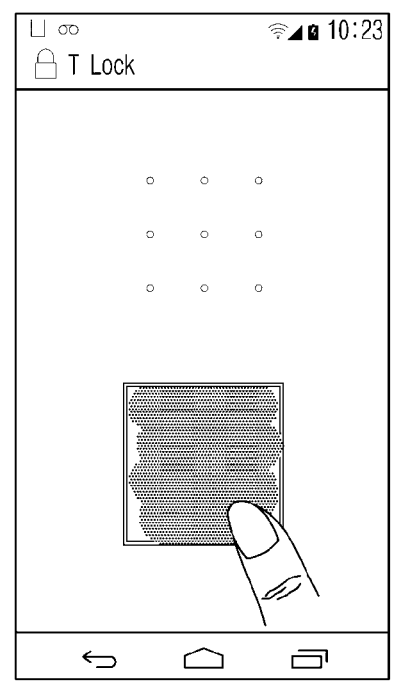

[FIG. 19A]
1910
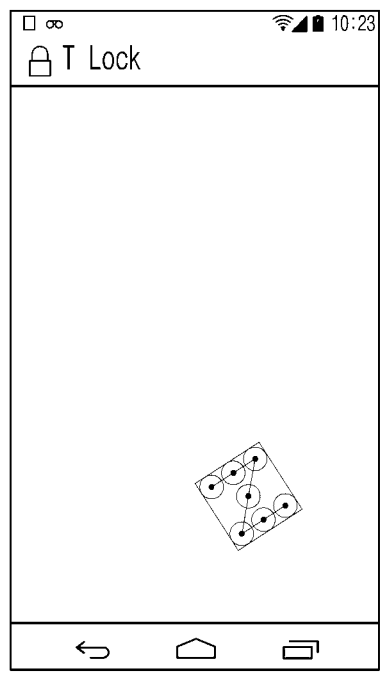
[FIG. 19B]
1920
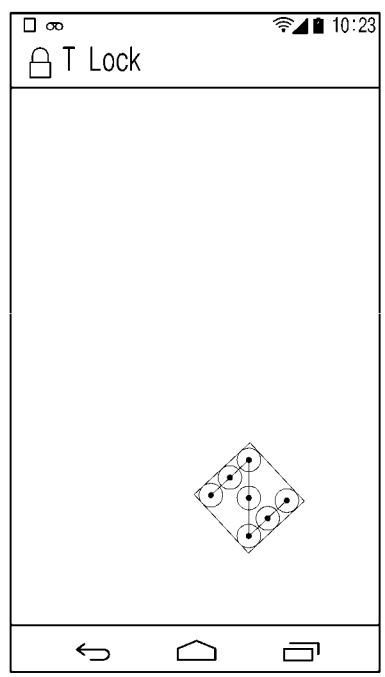

[FIG. 19C]
1930
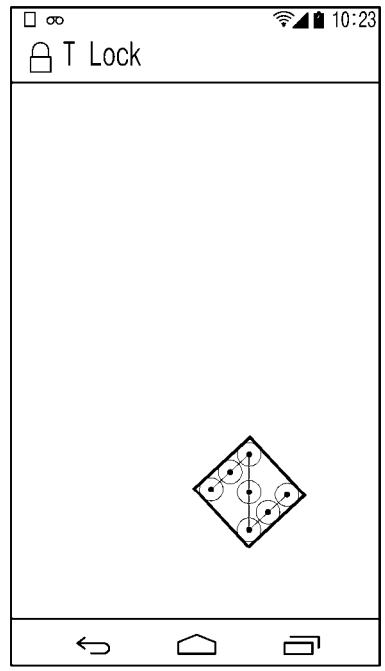
[FIG. 19D]
1940
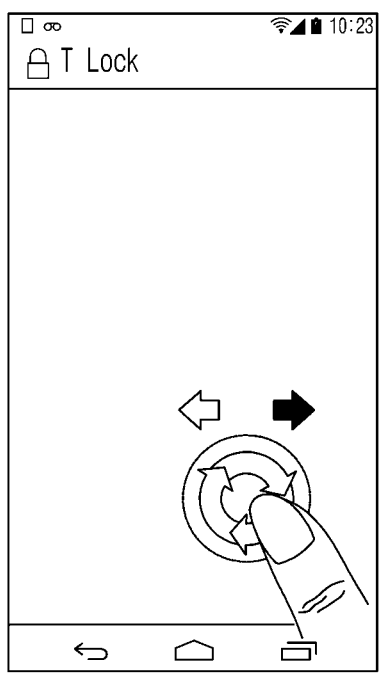

PATTERN INPUT APPARATUS AND METHOD, AND RECORDING MEDIUM USING THE SAME

CROSS-REFERENCE TO RELATED APPLICATIONS

This application is a U.S. National Stage of PCT/KR2014/009486 filed on Oct. 8, 2014, which claims priority from and the benefit under 35 U.S.C. § 119 (a) of Korean Patent Application No. 10-2013-0129817 filed on Oct. 30, 2013, which are hereby incorporated by reference for all purposes as if fully set forth herein.

BACKGROUND OF THE INVENTION

1. Field of the Invention

The present disclosure relates to a pattern input apparatus, a pattern input method, and a recording medium using the same, and more particularly, to a pattern input apparatus and a pattern input method which avoid pattern information from being leaked by a smudge attack in a device for inputting a pattern for user authentication, such as a mobile smart computing device or a smart digital door lock.

2. Description of the Related Art

Recently, many people use various mobile smart computing devices such as a smart phone, a tablet computer, a table top computer, or the like. People who handle various tasks using a mobile smart computing device are increasing. As tasks which are handled using the mobile smart computing device, there are lots of processing of information in which security is seriously considered including personal information utilization, task related information or financial service task such as internet banking service. Further, in many cases, people store information in which security is seriously considered, such as personal information or task information, in the mobile smart computing device.

As an example of improving security, a mobile smart computing device requests user authentication using a pattern lock. For example, the mobile smart computing device provides nine nodes to a user and the user connects four or more nodes, among the provided nine nodes, to input the pattern, thereby authenticating the user. The number of nodes may vary.

Even though the pattern lock function allows the user to feel convenient, there is a problem in that a trace of the pattern is left on a screen as the user inputs the pattern. For example, a secret pattern of the user may be easily leaked by the smudge attack which estimates the secret pattern which allows the user authentication using the trace of the pattern left on the screen.

FIG. 1 illustrates an example of estimating a secret pattern of a smart phone using a smudge attack. The smudge attack will be described with reference to FIG. 1. The smudge attack is a method to allow a person who finds a mobile smart computing device of the other person, such as a smart phone, to most quickly hack the smart phone. As an example of the smudge attack, when the smart phone is obliquely disposed, a finger print is easily leaked. A secret pattern which unlocks a pattern lock may be estimated using the trace of the finger print.

In the smudge attack, a rate of success of secret pattern estimation may be increased while varying an angle, brightness, and a shade. Further, when the user inputs the secret pattern in an open place, people in the vicinity of the user may learn by watching the input pattern of the user to easily infer the secret pattern.

SUMMARY OF THE INVENTION

An object of the present disclosure is to provide a pattern input apparatus and a pattern input method, which are strong to the smudge attack by inputting a pattern using a manipulation pad, instead of directly inputting the pattern through a pattern lock interface like a pattern function of the related art.

Further, an object of the present disclosure is to provide a pattern input apparatus and a pattern input method including a virtual wheel which distorts a pattern input trace.

Furthermore, an object of the present disclosure is to provide a pattern input apparatus and a pattern input method, which are strong to the smudge attack by inputting a pattern through a manipulation pad which is smaller than a pattern lock interface.

Further, an object of the present disclosure is to provide a pattern input apparatus and a pattern input method, which are stronger to the smudge attack by frequently changing a position of the manipulation pad.

Technical objects of the present invention are not limited to the aforementioned technical objects and other technical objects which are not mentioned will be apparently appreciated by those skilled in the art from the following description.

According to an aspect of the present invention, there is provided a method for inputting a pattern for user authentication of a device. The method may include providing a virtual manipulation interface to input a pattern on a screen of the device to the user, separately from a pattern lock interface which is displayed on the screen of the device or hidden from the screen by a pattern input device which provides an interface to input a pattern, and inputting the pattern through the virtual manipulation interface.

The device includes a smart phone, a personal computer including a touch screen or a tablet which performs at least a part of an operation related with the user authentication, for example, an operation of inputting a pattern. The device refers to an electronic device which may input a pattern in accordance with the touch of the user, but is not limited to a specific device. The pattern input device may be a device itself or a module which performs a function related with pattern input in the device. Here, the module may be a processor included in the device or a touch screen.

The pattern input device receives the pattern input by the user through the pattern lock interface and a separate virtual manipulation interface. Specifically, the pattern may be input not through the pattern lock interface, but through the virtual manipulation interface.

Here, the pattern lock interface is an interface which is directly provided to input a pattern. The pattern lock interface has some concepts similar to those of the interface of the related art, but does not directly receive the touch from the user. The pattern input device of the present disclosure does not input the pattern using the pattern lock interface, but receives the pattern through the virtual manipulation interface which is separately provided.

The virtual manipulation interface receives the pattern to be authenticated from the user but may be implemented so as not to directly interwork with a separate authentication module which determines authenticity of the pattern. The authentication module may determine whether a pattern to be input is equal to or similar to an already registered pattern with respect to the pattern lock interface. Here, the meaning of "virtual" is an expression to reflect a concept of an interface which does not directly interwork with the authentication module from a view point of the pattern authentication, but is separately and additionally provided from the existing pattern lock interface. Therefore, in the present disclosure, the virtual manipulation interface and the manipulation interface may be understood as the same concept.

The virtual manipulation interface and the pattern lock interface are simultaneously provided on the screen of the device and may be present in different regions. A size of the region where the virtual manipulation interface is provide may be equal to or smaller than a size of a region where the pattern lock interface is provided. Various sizes and positions of the pattern lock interface and the manipulation interface may be set by the user.

Further, the virtual manipulation interface may be provided with a predetermined size and in a predetermined position or may be provided with different sizes and in different position at every time. Even though the virtual manipulation interface is provided with a predetermined shape, when there is an input to select a position from the user with related to the position where a pattern input performed, a new manipulation interface may be provided in the selected relevant region.

Even though the manipulation interface is provided with a predetermined size and in a predetermined position on the screen in advance, when there is an input to select any one point in a region other than the above region, a virtual manipulation interface in accordance with a user setting or a virtual manipulation interface having a variable size may be provided. When any one point is selected by the user, the position where the virtual manipulation interface is provided may be implemented to include the selected point and a predetermined region within a predetermined distance from the point.

The pattern input method of the present disclosure may further include providing a feedback to the user when a pattern input or touch input in accordance with the manipulation of the user through the virtual manipulation interface is detected.

When a session to provide a virtual manipulation interface starts again after a session related with the pattern input of the user ends, a position of a region where the newly starting virtual manipulation interface is provided may be the same as the existing position or at least partially changed. The position and the size of the region where the virtual manipulation interface is provided may be the same as those of the previous manipulation interface.

In the providing of a pattern lock interface, information on the pattern input by the user through the virtual manipulation interface may be selectively provided to the user. In other words, no information may be provided. Further, information on a starting point to form a pattern among information on the pattern input may be provided to the user. Vibration feedback for the pattern input may be provided and in this case, the user may recognize that the pattern is input.

Further, in the providing of a pattern lock interface, information on a node which is currently input among information on the pattern input through the virtual manipulation interface, specifically, information on the node of the pattern which is currently input and information on a user input direction among the information on pattern input may be selectively provided to the user. All the information on pattern input may be provided to the user.

Here, the pattern input may be a rotation input, a zigzag input, a horizontal input, a vertical input, and a combination of two or more of the above inputs. The method of providing information on the pattern input may also be applied to the virtual manipulation interface by the same manner.

The pattern input through the virtual manipulation interface may be classified into a first pattern from a time when pattern input starts to a time when a direction of the input pattern changes and a second pattern after the time when the pattern input direction changes.

In this case, the method may further include determining a region where the virtual manipulation interface is displayed using at least a part of the first pattern in accordance with the above definition and determining whether to end the session and initialize the session when at least a part of the second pattern goes beyond the determined region.

Here, the determining of the region where the manipulation interface is provided specifically determines a position, a size, or a direction of the manipulation interface provided using the first pattern with respect to a pattern input speed, position, or direction which is determined in advance.

Further, next to the providing of the virtual manipulation interface to the user, the method may further include providing an additional input interface which demands a specific additional input of the user when the pattern input of the user ends.

The additional input interface may include a virtual wheel interface, a touch brush interface, or the like. The touch brush interface is an interface which provides a brush touch effect (a brush effect or an effect in that a pixel value of the corresponding region varies) in a region where the additional input (for example, a touch input) of the user is present.

The additional input interface may be provided to the user to be present in a region including a predetermined percentage or higher of the screen region of the device where the virtual manipulation interface is present. Here, when the providing of a manipulation interface ends, for example, a session related with the inputting of a pattern ends or a session to provide the manipulation interface ends.

Next to the receiving of a pattern for user authentication from the user from the virtual manipulation interface, the present disclosure may further include performing finger print authentication using a finger print of the user which is included in the input pattern.

The performing of finger print authentication may be applied to both cases when the position of the manipulation interface is fixed and when the position of the manipulation interface varies. Specifically, the finger print authentication may be performed using a finger print image of the user obtained at a turning point where the direction of the input pattern changes.

The performing of finger print authentication may further include correcting a finger print image obtained at the turning point using the direction of the input pattern or generating a representative finger print image using a plurality of finger print images obtained when a plurality of turning points is provided. When at least one of the corrected finger print image and the generated representative finger print image is used, incorrect recognition of the finger print authentication may be lowered.

According to another aspect of the present disclosure, there is provided a pattern input apparatus including a pattern lock interface unit which provides a pattern lock interface which is displayed or hidden during the pattern input process for user authentication, and a manipulation interface unit which provides a virtual manipulation interface to the user to input a pattern on a screen of the device separately from the pattern lock interface.

Further, the pattern input device of the present disclosure may further include an additional input interface unit which provides an additional input interface which demands an additional input of the user when the providing of the manipulation interface ends because it is determined that the user pattern input ends.

The additional input interface unit may provide a virtual wheel interface or a touch brush interface. A position of the provided additional input interface may be provided to the user to be present in a region including a predetermined percentage or more region of the screen region of the device where the virtual manipulation interface is present.

The virtual manipulation interface unit provides a virtual manipulation interface again when it is determined that the user pattern input ends. In this case, a position of the region where the virtual manipulation interface is provided may be changed if necessary.

The pattern lock interface unit may provide information on an early stage of pattern input or starting point among the information on the input pattern, to a user. The pattern lock interface unit may provide only information on a node which is currently input among the information on the pattern input, to the user. The pattern lock interface unit may provide information on a node of the pattern which is currently input and an input direction of the user, among information on the input pattern, to the user.

As described above, the pattern input method and the pattern input apparatus of the present disclosure are strong to the smudge attack. Further, even though the user inputs the secret pattern in an open place, the secret pattern may not be leaked to people in the vicinity of the user.

BRIEF DESCRIPTION OF THE DRAWINGS

The above and other aspects, features and other advantages of the present disclosure will be more clearly understood from the following detailed description taken in conjunction with the accompanying drawings, in which:

FIG. 1 illustrates an example of leaking a secret pattern of a smart phone using a smudge attack;

FIG. 2 is a block diagram of a pattern input apparatus according to an exemplary embodiment of the present disclosure;

FIG. 3 is a view illustrating an example of a virtual manipulation interface which is provided by a virtual manipulation interface unit and a pattern lock interface which is provided by a pattern lock interface unit, according to the present disclosure;

FIG. 4 is a view illustrating an aspect in which a user inputs a "Z" shaped pattern through a virtual manipulation interface;

FIG. 5 is an example in which a pattern lock interface unit provides all pattern input information to a user through a pattern lock interface;

FIGS. 6A to 6C are examples in which a pattern lock interface unit provides a part of pattern input information to a user through a pattern lock interface;

FIGS. 7A to 7D are other examples in which a pattern lock interface unit provides a part of pattern input information to a user through a pattern lock interface;

FIG. 8 is a view illustrating an example of a virtual wheel interface which is provided by a virtual wheel interface unit of the present disclosure;

FIGS. 9A to 9H are examples of a pattern input method which determines a size of a virtual manipulation interface;

FIGS. 10A to 10E are examples in which an area of a manipulation interface is extended;

FIGS. 11A to 11E are examples in which the area of the manipulation interface is not extended;

FIGS. 12A to 12D are examples of pattern input further including a step of recognizing a finger print according to an exemplary embodiment of the present disclosure;

FIGS. 13A to 13D are examples illustrating a finger print image obtained in a turning point of the pattern input and a direction immediately before turning;

FIG. 14 is an example of composing images at a center part to create a final finger print;

FIG. 15 is a flow chart of a pattern input method according to an exemplary embodiment of the present disclosure;

FIGS. 16A to 16D are views illustrating an example of providing a manipulation interface to a user by a virtual manipulation interface unit;

FIGS. 17A to 17D are examples, similar to FIGS. 16A to 16D, in which a point selected by a user does not correspond to any one of nodes of a pattern lock interface;

FIGS. 18A and 18B are other examples of an additional input interface according to an exemplary embodiment of the present disclosure; and FIGS. 19A to 19D are examples in which a virtual manipulation interface is obliquely provided.

DETAILED DESCRIPTION OF THE PREFERRED EMBODIMENT

Hereinafter, exemplary embodiments of the present disclosure will be described in detail with reference to the accompanying drawings. Advantages and features of the present disclosure, and methods for accomplishing the same will be more clearly understood from exemplary embodiments described below with reference to the accompanying drawings. However, the present disclosure is not limited to the following exemplary embodiments but may be implemented in various different forms. The exemplary embodiments are provided only to complete disclosure of the present disclosure and to fully provide a person having ordinary skill in the art to which the present disclosure pertains with the category of the invention, and the present disclosure will be defined by the appended claims. Like reference numerals generally denote like elements throughout the specification.

It should be understood that, when it is described that an element is coupled or connected to another element, the element may be directly coupled or directly connected to the other element or coupled or connected to the other element through a third element. In contrast, it should be understood that, when it is described that an element is directly coupled or directly connected to another element, no element is present between the element and the other element.

Unless otherwise defined, all terms (including technical and scientific terms) used in the present specification may be used as the meaning which may be commonly understood by the person with ordinary skill in the art, to which the present invention belongs. It will be further understood that terms defined in commonly used dictionaries should not be interpreted in an idealized or excessive sense unless expressly and specifically defined.

In this description, a singular form may include plural form if not specifically mentioned. The word "comprises" and/or "comprising" used in the present specification will be understood to imply the inclusion of stated constituents, steps, operations and/or elements but not the exclusion of any other constituents, steps, operations and/or elements.

An input device according to the present disclosure may be applied to a mobile smart phone, a tablet computer, a table top device, and a digital door lock device, which may receive user input, such as a touch pad. Further, the present disclosure may be applied in a general PC environment such as a desk PC, which is not a portable device.

According to a pattern input method of the related art, the user directly inputs the pattern into a pattern lock interface. However, according to the present disclosure, in order to avoid the smudge attack, the user inputs a pattern using a manipulation pad, instead of directly inputting the pattern into the pattern lock interface.

Further, according to the present disclosure, additional input interfaces, for example, a virtual wheel interface or a touch brush interface are used to promote security safety against the smudge attack.

The present disclosure will be described in detail with reference to the drawings.

FIG. 2 is a block diagram of a pattern input apparatus according to an exemplary embodiment of the present disclosure. Referring to FIG. 2, a pattern input apparatus 100 according to an exemplary embodiment of the present disclosure may include a manipulation interface unit 110, a pattern lock interface unit 120, and an additional input interface unit 130. The pattern input apparatus of the exemplary embodiment may be a device for user authentication itself and may include an apparatus which is included in the device and performs a function related with pattern input, for example, a processor and a touch screen. The device is a device which demands a pattern for user authentication such as a mobile smart phone or a digital door lock and a kind of the device is not specifically limited.

In FIG. 2, the manipulation interface unit 110 may provide a virtual manipulation interface for inputting a pattern on a screen of the device to a user. Here, the virtual manipulation interface is additionally provided separately from a pattern lock interface which is provided in a pattern input system of the related art. The virtual manipulation interface is provided to easily receive a pattern input through user manipulation with improved security.

The pattern which is input to the manipulation interface unit 110 is classified into a first pattern from a time when pattern input starts to a time when a direction of the pattern changes and a second pattern after the time when the pattern input direction changes. The first pattern input is an initial value of the pattern input and the manipulation interface unit 110 may determine a size of a provided manipulation interface using the first pattern input.

The pattern lock interface unit 120 may provide a pattern lock interface which provides a part or all of information on a pattern which is input through a virtual manipulation interface, to the user. Further, the pattern lock interface unit 120 may be implemented so as not to be leaked to the outside, in order to avoid information on a secret pattern from being leaked.

When it is determined that the pattern input by the user ends so that the providing of a manipulation interface ends, the additional input interface unit 130 may provide a virtual wheel interface and a touch brush interface which require specific input of the user.

FIG. 3 is a view illustrating an example of a virtual manipulation interface which is provided by a virtual manipulation interface unit and a pattern lock interface which is provided by a pattern lock interface unit of the present disclosure.

Referring to FIG. 3, a pattern lock interface which is provided to the user by the pattern lock interface unit 120 is provided on an upper portion of a screen of the device. Further, a manipulation interface which is provided to the user by the manipulation interface unit 110 is provided on a lower portion of the screen of the device. The user may input a secret pattern for user authentication through the provided manipulation interface.

As illustrated in FIG. 3, the virtual manipulation interface and the virtual pattern lock interface may be simultaneously provided. Further, the virtual manipulation interface and the virtual pattern lock interface may be provided in different regions on the screen of the device.

Further, a size of the region on the screen of the device which is occupied by the virtual manipulation interface provided by the manipulation interface unit 110 may be equal to or smaller than a size of the region on the screen of the device which is occupied by the pattern lock interface.

The size of the region on the screen of the device which is occupied by the virtual manipulation interface is set to be smaller than the size of the region on the screen of the device which is occupied by the pattern lock interface, in order to avoid pattern information from being leaked to people in the vicinity of the user when the user inputs the secret pattern in an open place. However, in order to avoid the user from imprecisely inputting the pattern due to the small size of the virtual manipulation interface, a part or all of pattern input information which is input by the user using the manipulation interface may be provided to the user through the pattern lock interface.

Specifically, examples in which the pattern lock interface unit 120 transmits a part or all of pattern input information will be described with reference to FIGS. 4 and 7. The pattern lock interface provided herein may be implemented so as not to be displayed at all for the purpose of security.

FIG. 4 is a view illustrating an aspect in which a user inputs a "Z" shaped pattern through a virtual manipulation interface. More specifically, FIG. 5 and FIGS. 7A to 7D illustrate an example in which a user inputs a "Z" shaped pattern, similarly to FIG. 4.

As an example of pattern input, when the pattern is input by the manipulation of the user, the manipulation interface unit 110 may provide a feedback such as vibration or sound to the user in order to notify that the input is being progressed to the user. In another example, the manipulation interface unit 110 may provide a virtual manipulation interface obliquely with respect to the pattern lock interface at a predetermined angle. Further, when the user obliquely inputs a pattern at a predetermined angle, the manipulation interface unit 110 may correct the obliquely input pattern to be horizontal and transmit the corrected pattern to the pattern lock interface unit 120.

FIG. 5 is an example in which a pattern lock interface unit provides all the pattern input information to a user through a pattern lock interface. Referring to FIG. 5, when the pattern input information of the user has a "Z" shape, the pattern lock interface may provide the entire "Z" shape which is pattern input information input by the user, to the user. However, in order to avoid the pattern from being leaked in the open place, only a part of the input pattern information may be provided to the user.

FIGS. 6A to 6C are examples in which a pattern lock interface unit provides a part of pattern input information to a user through a pattern lock interface. Referring to FIGS. 6A to 6C, the pattern lock interface unit 120 may provide only information on a node which is currently input while the user is inputting the pattern, to the user through the pattern lock interface.

That is, when the pattern input by the user has a "Z" shape, the pattern lock interface unit 120 may provide information on a node which is currently input, among nodes which are input by the user and configure the Z shape, to the user. Referring to FIGS. 6A to 6C, the pattern lock interface unit 120 may provide information on the node which is currently input to the user in the order of a first screen 610 of FIG. 6A, a second screen 620 of FIG. 6B, and a third screen 630 of FIG. 6C.

The pattern lock interface unit 120 provides the information on the node which is currently input to the user, thereby improving precision of pattern input of the user and allowing the user to easily find incorrect input.

FIGS. 7A to 7D are other examples in which a pattern lock interface unit 120 provides a part of pattern input information to a user through a pattern lock interface.

Referring to FIGS. 7A to 7D, the pattern lock interface unit 120 may provide information on a node which is currently input while the user is inputting the pattern and information on a pattern input direction of the user in the order of screens of FIG. 7A, FIG. 7B, FIG. 7C, and FIG. 7D, to the user through the pattern lock interface.

That is, the pattern lock interface unit 120 may provide information on the node which is currently input and the pattern input direction using pattern input information input by the user through the virtual manipulation interface, to the user through the pattern lock interface.

Specifically, the pattern lock interface unit 120 may provide information as illustrated in FIGS. 6A to 6C to the user using information on the node which is currently input by the user and the current pattern input direction of the user.

Further, the pattern lock interface unit 120 may provide information on a starting point to form the pattern among the pattern input of the user, that is, information on the first input node, to the user through the pattern lock interface, as illustrated in FIG. 3.

A position on the screen of the device where the virtual manipulation interface provided to the user by the manipulation interface unit 110 is disposed may vary whenever the user starts inputting a pattern.

Continuously, the additional input interface unit 130 will be described with reference to FIG. 2. When it is determined that the pattern input by the user through the manipulation interface ends, that is, a session related with the pattern input or a session related to manipulation interface providing ends, the additional input interface unit 130 may provide a virtual wheel interface and a touch brush interface which demand a specific additional input to the user.

It may be determined that the pattern input by the user ends in accordance with a predetermined criteria. As an example of the predetermined criteria, when the user inputs a pattern through touch input, if the touch is released, it may be determined that the pattern input by the user ends.

When the pattern input by the user ends, the manipulation interface unit 110 ends to provide the manipulation interface and the additional input interface unit 130 may provide the virtual wheel interface or the touch brush interface to the user. Here, the addition input may be any one of rotation input, zigzag input, horizontal input, and vertical input.

When the user performs specific additional input after the additional input interface unit 130 demands the additional input through the virtual wheel interface, a trace of the pattern input by the user is erased or distorted. Therefore, a secret pattern input by the user through the manipulation interface unit 110 may be protected from the smudge attack.

Therefore, the additional input interface unit 130 disposes the virtual wheel interface in a region matching a region on the device screen where the manipulation interface is provided to provide the virtual wheel interface to the user. Here, the additional input interface does not need to be disposed in a region which exactly matches the region where the manipulation interface is provided and may include a predetermined percentage or higher of the region where the virtual manipulation interface is provided. Here, the predetermined percentage or higher may refer to a ratio at which the trace of the pattern input by the user is distorted but is not specifically limited. The region where the additional input interface is provided may vary depending on a shape of the virtual manipulation interface. However, when the region is provided to include at least a region where the pattern is present, a part of the trace of the pattern may be removed.

A position of the virtual manipulation interface which is provided to the user by the manipulation interface unit 110 on the screen may vary whenever the user inputs the pattern. By doing this, when the position changes, the additional input interface unit 130 may dispose the additional input interface in a region on the screen of the device where the manipulation interface which is finally provided to the user is disposed.

FIG. 8 is a view illustrating an example of a virtual wheel interface which is provided by a virtual wheel additional input interface unit 130 of the present disclosure.

A virtual wheel interface illustrated in FIG. 8 is an example which demands rotation input of the user. Specifically, when FIGS. 8 and 3 are compared, it is understood that the region where the virtual wheel interface of FIG. 8 is disposed on the screen of the device substantially matches a region where the manipulation interface of FIG. 3 is disposed on the screen of the device. Specifically, the region where the virtual wheel interface is displayed may include a region where the manipulation interface is displayed. A size of the virtual wheel interface which is provided to the user by the virtual wheel interface unit 130 may be proportional to a size of the manipulation interface which is provided to the user by the manipulation interface unit 110.

FIGS. 9A to 9H illustrate examples of a pattern input method which determines a size of a manipulation interface. A screen in FIG. 9A is an example in which the user performs a first touch operation in a state where any items related with the pattern input are not displayed on the touch screen. A screen in FIG. 9B is an example illustrating a touch operation of the user next to the first touch. When the first touch operation is sensed by a touch sensor of the pattern input device, the manipulation interface unit 110 may display a vibration feedback and a touched point for a predetermined time, for example, 30 ms. It is also possible to implement the pattern input device of the exemplary embodiment to provide a vibration feedback in accordance with continuous touch input by the user.

A region where the touch is input through the manipulation interface may have a limited size. A position and a size of the manipulation interface which is a virtual pattern provided by the manipulation interface unit 110 may dynamically change. When the pattern of the user is sufficiently input, a size, a position, and a direction of the manipulation interface may be specified.

Here, when the pattern is sufficiently input, for example, a direction of the input pattern changes or a predetermined time elapses after inputting the pattern. In the present exemplary embodiment, the above case is referred to be as a first pattern. The manipulation interface unit 110 may determine a size, a position or a direction of a virtual manipulation interface or a pattern lock interface which is subsequently input, using the first pattern which is an initial input.

When the number of input points for every position (for example, in the case of the horizontal direction, left, center, and right) in any one of the horizontal direction and the vertical direction is three, the manipulation interface unit 110 may determine a final size of the manipulation interface (see screens in FIGS. 9C and 9F). Further, a final region and position where the manipulation interface is displayed may be specified after determining three input points for every position in both the horizontal direction and the vertical direction (see screens in FIGS. 9D and 9G).

Before determining the final size and position of the manipulation interface, the manipulation interface unit may show an edge region of the manipulation interface by a blurry line. When the final size and the position are determined, it may show the edge region by a bold line.

When a third point is input in a state when a first point and a second point are input as illustrated in FIG. 9B, if the user draws a pattern quickly or farther than the previous pattern, the manipulation interface unit 110 may display the second point such that the size and the position of the second point are changed with respect to the position where the third point is input as illustrated in FIG. 9F. FIG. 9C is an example in which the user draws the pattern at a similar speed or with a similar length so that the size and the position of the second point are not changed. Meanwhile, FIGS. 9E and 9H are examples of screens which is included a virtual wheel interface in regard to a manipulation interface sizes of the virtual wheel interfaces in FIGS. 9E and 9H may be proportional to sizes of the manipulation interfaces in FIGS. 9D and 9G.

Since the size and the position of a virtual pad vary, when an ambiguous pattern (for example, a pattern having a size of 2 by 2) is used, the ambiguous pattern may be limitedly used for user authentication or additional operation may be requested after completely inputting the pattern. The user may input a secret pattern through a virtual pad having a variable size without performing an additional operation. Initial input patterns are drew as small dots and the sizes of the dots may be increased as the length of the pattern is increased.

FIGS. 10A to 10E are examples in which an area of the virtual manipulation interface is extended and FIGS. 11A to 11E are examples in which the area of the manipulation interface is not extended.

As illustrated in screens 1010 to 1030 of FIGS. 10A to 10C, when there are user inputs in the order of the screens 1010, 1020 and 1030, the manipulation interface unit 110 may determine a size of the virtual manipulation interface which is provided to a comparatively small area. However, the manipulation interface may change the size of the manipulation interface again in accordance with a next pattern which is input by the user. That is, even though the size is determined to be small by the first pattern, the size may be changed by the second pattern.

When the pattern to be input by the user is 1050 of FIG. 10E, an example of 1040 of FIG. 10D which draws a pattern by a virtual pad in a small region having the same pattern size is considered as a pattern which cannot be input. Therefore, the size of the manipulation interface may be automatically changed as illustrated in 1050 of FIG. 10E. The size of the manipulation interface which is preferentially determined is provided to serve as a guide for a user who wants to input a pattern in a small area. A size of the virtual pad which is subsequently determined helps a user who wants to input a pattern in a larger area.

In contrast, when there are user inputs in the order of screens 1110, 1120 and 1130 as illustrated in the screens 1110 to 1130 of FIGS. 11A to 11C, in an example of a screen 1150 of FIG. 11E, the size of the manipulation interface is determined to be a large area. The manipulation interface unit 110 may receive the pattern input through the manipulation interface even though there is an input smaller than the size determined in 1140 of FIG. 11D. This is because, as described above, usage of the ambiguous pattern (for example, a pattern having a size of 2 by 2) may be restricted.

FIGS. 12A to 12D are examples of pattern input further including a step of recognizing a finger print according to an exemplary embodiment of the present disclosure. FIGS. 13A to 13D illustrate examples of a finger print image obtained at a turning point of the pattern input. The finger print may be recognized by a processor in the device or by a separate external server, but is not specifically limited. Here, the turning point is a point at which a pattern input direction is changed or pattern input starts/ends. FIGS. 12A to 12D illustrate turning points which starts from the screen 1210 of FIG. 12A to the screen 1240 of FIG. 12D and a big circuit indicates the turning points. In FIGS. 13A to 13D, pattern input directions are illustrated by an arrow together with images obtained at the turning points of FIGS. 12A to 12D. Obtained image information and information on the direction may be used for pattern authentication.

The manipulation interface unit 110 receives a pattern from the user and transmits the input pattern to the pattern lock interface unit 120. The pattern lock interface unit reflects a degree of transmitted pattern in accordance with a predetermined rule to display the degree of pattern on a screen. A finger print recognizing module or a finger print recognizing server which recognizes the fingerprint receives information on a pattern input through the pattern lock interface to recognize the finger print.

Specifically, in the present exemplary embodiment, the manipulation interface unit 110 recognizes a turning point which is generated while drawing the pattern and obtains an image in accordance with the turning point. The finger print image related with the turning point may be directly obtained by the manipulation interface unit through image processing on an image obtained in a region where the manipulation interface is displayed. Otherwise, the finger print image may be transmitted from software or a sensor element which is separately provided in the device.

In FIGS. 12A to 12D, the finger print pattern may be defined by touch, touch draw 1, draw 1-draw 2, and draw N−1 to draw N. When the user switches the direction two times while drawing the pattern, that is, there are two turning points, the number of finger print images which are treated for finger print recognition may be four in total.

In the present exemplary embodiment, it is described that the finger print is initially input by the manipulation interface unit. However, the system may be implemented such that a substantial finger print recognizing procedure may be performed by a separate authentication module in the device or a fingerprint server which is provided separately from the device.

In the finger print recognizing process, a plurality of obtained finger print patterns may be compared with an original finger print which is already stored to minimize a false reject rate (FRR) and a false accept rate (FAR), by two ways. It may be determined whether the authentication is successfully performed in accordance with a comparison result. In the finger print recognizing process for minimizing the FRR, for example, several finger prints obtained at the turning point are compared with a registered finger print which is already independently stored to minimize the FRR. By doing this, the finger print may be recognized without being significantly affected by a condition (for example, dry) of hands.

Further, in order to minimize the FAR, shape matching is performed on shapes of several finger prints obtained during the pattern recognizing process to correct the finger print. Therefore, a finger print image which is one of final finger print images to be compared with the already stored registered finger print is generated.

For example, an average value of the finger print image obtained at the turning point may be generated as a final finger print image. Further, two-dimensional or three-dimensional warping is performed on the finger print image obtained at the turning point but the obtained finger print image is modified to be opposite to the direction change by considering the direction change at the turning point to be used as a final finger print image.

The exemplified finger print recognizing process is aimed to minimize the FAR, but does not affect the FRR. Specifically, it is desirable to generate one final finger print through a shape matching of a restricted finger print shape (for example, a specific part at a center of the finger print) which is precisely recognized, rather than generate an average image for entire shape of all obtained finger prints and recognize the finger print using the same (see FIG. 14). By doing this, the FAR is not increased to be higher by minimizing the FRR. A closed curve of FIG. 14 is an image of a center portion obtained from the obtained finger print image and one final finger print may be composed only using images of the center portion in accordance with a known technology.

According to the above-described exemplary embodiment, two channel user authentication functions of the pattern authentication and the finger print authentication may be performed. Further, the FRR and FAR generated during the finger print recognizing process may be minimized through correction.

FIG. 15 is a flow chart of a pattern input method according to an exemplary embodiment of the present disclosure.

Referring to FIG. 15, the manipulation interface unit 110 provides a virtual manipulation interface to the user to receive pattern input by the user in step S910. The manipulation interface unit is provided to provide a virtual pattern interface which is separate from the pattern lock interface unit of the related art. The input pattern of the user which is input through an interface provided by the manipulation interface unit is an input pattern for user authentication and is directly processed by a separate authentication module (not illustrated).

Further, information of an input pattern input through the virtual manipulation interface is interlinked with a pattern provided by the pattern lock interface unit and a pattern in the pattern lock interface which is determined to be interlinked with the input pattern may be treated as a pattern for the user authentication.

Further, the authentication module (not illustrated) may calculate (add) a first similarity between a pattern input through the manipulation interface unit and a secret pattern which is already stored and a second similarity between an interlinked pattern of the pattern lock interface which matches a position of a pattern input through the manipulation interface unit and the secret pattern which is already stored in accordance with a predetermined weight to determine whether to match the final pattern.

The pattern lock interface unit 120 may provide a part or all of information on the pattern input of the user through the manipulation interface to the user in step S920. However, according to another exemplary embodiment of the present invention, the pattern through the pattern lock interface may not be displayed.

When it is determined that the pattern input by the user ends so that the providing of a virtual manipulation interface ends, the additional input interface unit 130 may provide an additional input interface (a virtual wheel interface) which demands the user a specific input in step S930.

FIGS. 16A to 16D are views illustrating examples of providing a manipulation interface to a user by a manipulation interface unit of the present disclosure.

A manipulation interface unit 110 may provide a manipulation interface to the user after receiving an input to select any one point on a screen of the device from the user. Specifically, the manipulation interface unit 110 may generate a manipulation interface in a region including any one point or with respect to an arbitrary point selected by the user to provide the manipulation interface to the user.

Referring to 1610 of FIG. 16A, when an arbitrary point selected by the user is any one node of the pattern lock interface, a virtual manipulation interface may be generated with respect to an arbitrary node selected by the user or in a predetermined region including the arbitrary node as illustrated in 1620 of FIG. 16B.

Referring to 1630 and 1640 of FIGS. 16C and 16D, the user may input a secret pattern using a virtual manipulation interface which is generated after inputting any one node.

FIGS. 17A to 17D are views illustrating examples of providing a virtual manipulation interface to a user by a manipulation interface unit of the present disclosure. Examples of FIGS. 17A to 17D are similar to FIGS. 16A to 16D, but the examples of FIGS. 17A to 17D are cases which a point selected by a user does not correspond to any one of nodes of a pattern lock interface.

As illustrated in 1710 of FIG. 17A, the point selected by the user does not correspond to any one node of the pattern lock interface and the manipulation interface unit 110 generates a manipulation interface with respect to the point selected by the user or in a predetermined region including the selected point to provide the manipulation interface to the user (see 1720 of FIG. 17B and 1730 of FIG. 17C). Further, the additional input interface unit is interlinked therewith and provides the additional input interface in a region where the virtual manipulation interface is located as illustrated by 1740 of FIG. 17D.

The manipulation interface unit 110 may not visually provide the manipulation interface to the user at the beginning of the virtual manipulation interface which is provided to the user. However, the manipulation interface unit 110 may visually provide a part or all of the manipulation interface in accordance with the secret pattern input during the secret pattern input by the user.

Further, the user may input the pattern in an arbitrary region and may input a pattern having a variable size. The pattern having a variable size refers that the size of the manipulation interface is not determined while drawing a pattern and lengths of lines which configure the pattern may be different from each other. For example, a line connecting a point 1 and a point 2 and a line connecting the point 2 and a point 3 may have different lengths. To this end, it is notified that the pattern is drawn through an additional touch operation (moves to a next node) so that a direction of the drawn pattern may be recognized.

FIGS. 18A and 18B are other exemplary embodiments of the additional input interface. Additional input interfaces of FIGS. 18A and 18B are touch brush interfaces which is provided as a touch brush manner. As illustrated in FIGS. 18A and 18B, when there is a touch input from the user, a brush or paint effect may be provided on a screen close to the region where the input is generated. Further, the specific input may be a scratch type input. When the user displays a region like a rectangle frame having a same or similar to the manipulation interface to remove a trace of inputting the pattern on a screen, the user inputs a specific input of a predetermined manner to delete the trace of the pattern input.

FIGS. 19A to 19D are examples in which a virtual manipulation interface is obliquely provided. According to an exemplary embodiment of the present disclosure, the user may input a pattern not horizontally but obliquely at a predetermined angle in a region where the virtual manipulation interface is present. Screens 1910 and 1920 of FIGS. 19A and 19B are examples in which user inputs patterns with different gradients.

1930 of FIG. 19C visually illustrates that the manipulation interface unit 110 detects the pattern input from the user. In this case, the manipulation interface unit 110 may not distinguish whether the input of the user is Z or N. In this exemplary embodiment, additional input of the user which is input through a virtual wheel interface is further considered so that the manipulation interface unit 110 may distinguish whether the input pattern is Z or N. For example, when the user manipulates the virtual wheel in a clock wise direction in 1940 of FIG. 19D, the oblique direction of the pattern input by the user is right so that the manipulation interface unit 110 may determine that the input pattern is Z. In contrast, when the user manipulates the virtual wheel in a count clock wise direction, it is determined that the oblique direction is left and the input pattern is N.

That is, the manipulation interface unit 110 determines the rotation direction of the pattern which is not horizontally input using additional input information input through the additional input interface and rotates the input pattern in consideration of the determined rotation direction to correct the pattern to be a horizontal pattern. Information on the corrected horizontal pattern is transmitted to the pattern lock interface 120.

The pattern input method as described above may be implemented in a recording medium as a computer readable code. That is, the recording medium which implements the pattern input method according to the present disclosure may be a medium which records a program which performs a process of providing a manipulation interface for the pattern input on the screen of the device to the user, a process of providing a pattern lock interface which provides a part or all of the information on the pattern input through the manipulation interface to the user, and a process of providing a virtual wheel interface which demands a specific input of the user when it is determined that the pattern input of the user ends so that the manipulation interface providing ends.

The computer-readable recording media includes all types of recording media in which data that can be read by a computer system is stored. Examples of the computer readable recording media may include a RAM, a ROM, a CD-ROM, a magnetic tape, an optical data storage device, and a floppy disk and may be implemented by transmission through Internet or a carrier wave.

Further, the computer readable recording medium is distributed in computer systems connected through a network and a computer readable code is stored therein and executed in a distributed manner. Further, a functional program, code, and code segment which may implement the recording method may be easily deducted by a programmer in the related art.

Components of the present disclosure may refer to software or hardware such as a field programmable gate array (FPGA) or an application specific integrated circuit (ASIC). However, the components are not limited to the software or the hardware but may be configured to be provided in an addressable storage medium or configured to execute one or more processors. A function provided in the components may be implemented by subdivided components and a plurality of components is combined to be implemented as one component which performs a specific function.

The exemplary embodiments of the present disclosure have been described with reference to the accompanying drawings, but those skilled in the art will understand that the present disclosure may be implemented in another specific form without changing the technical spirit or an essential feature thereof. Thus, it is to be appreciated that embodiments described above are intended to be illustrative in every sense, and not restrictive.

What is claimed is:

1. A method for inputting a pattern for user authentication of a device, the method comprising:
    providing a virtual manipulation interface to receive the pattern on a screen of the device from the user;
    receiving the pattern from the user through the virtual manipulation interface; and
    providing a pattern lock interface which is displayed on the screen of the device or hidden from the screen separately from the virtual manipulation interface and provides information on the pattern which is input through the virtual manipulation interface to the user,
    wherein the providing of the virtual manipulation interface includes providing the virtual manipulation interface to the user after receiving an input to select a point on the screen of the device by the user,
    wherein the virtual manipulation interface which is provided to the user is generated in a region including the selected point,
    wherein the selected point is any one node of the pattern lock interface,
    when a session related with the receiving of the pattern ends, providing an additional input interface which demands additional input to delete a trace of a pattern which is input through the virtual manipulation interface,
    wherein the additional input interface is provided to the user so as to be included in a predetermined percentage or higher of the region where the virtual manipulation interface is provided, and
    wherein the providing of the pattern lock interface is providing a part of information on the pattern which is input through the virtual manipulation interface to the screen of the device.

2. The method according to claim 1, wherein the virtual manipulation interface is a first virtual manipulation interface, and
    wherein when a second virtual manipulation interface is provided after the session related with the receiving of the pattern ends, a position of the second virtual manipulation interface is the same as a position of the first virtual manipulation interface or at least partially changed therefrom.

3. The method according to claim 1, wherein the additional input interface is a virtual wheel interface and the additional input is any one of a rotation input, a zigzag input, a horizontal input, a vertical input, or a combination thereof.

4. The method according to claim 1, wherein the additional input interface provides a predetermined touch effect in a region where the additional input is located, the additional input is any one of a rotation input, a zigzag input, a horizontal input, a vertical input, or a combination thereof, and the touch effect is an effect which changes a pixel value of a region where the additional input is located.

5. The method according to claim 1, wherein the pattern lock interface and the virtual manipulation interface are provided to be oblique from each other so as not to be parallel to each other.

6. The method according to claim 1, wherein when the pattern is not horizontally, but obliquely input, a manipulation interface unit which provides the virtual manipulation interface determines a direction of the pattern which is obliquely input using the additional input, corrects the pattern using the determined direction, and provides information on the corrected pattern to a pattern lock interface unit which provides the pattern lock interface.

7. The method of claim 1, wherein the providing of the virtual manipulation interface to the user further includes:
providing a feedback to the user when an input in accordance with manipulation of the user is generated.

8. The method according to claim 1, wherein in the providing of the pattern lock interface, information on a starting point to form a pattern among information on the pattern is provided to the user, only information on a node which is currently input is provided to the user, or the information on the node which is currently input and an input direction of the user are provided to the user.

9. The method according to claim 1, wherein the pattern includes a first pattern from a first time when pattern input starts to a second time when a direction of the pattern changes and a second pattern after the second time.

10. The method according to claim 9, wherein the receiving of the pattern further includes:
determining the region where the virtual manipulation interface is provided using at least a part of the first pattern; and
determining whether to initialize the pattern input when at least a part of the second pattern goes beyond the region where the virtual manipulation interface is provided.

11. The method according to claim 10, wherein in the determining of the region, the region is determined using predetermined criteria for a predetermined pattern input speed, a position, or a direction and at least a part of the first pattern input.

12. The method according to claim 1, further comprising:
after the receiving of the pattern, performing finger print authentication using a finger print of the user which is included in the pattern.

13. The method according to claim 12, wherein in the performing of finger print authentication, the finger print authentication is performed using a finger print image of the user obtained at a turning point where a pattern input direction changes.

14. The method according to claim 13, wherein the performing of finger print authentication further includes correcting a finger print image obtained at a turning point using the pattern input direction or generating a representative finger print image using a plurality of finger print images obtained when a plurality of turning points are provided, and
wherein the finger print authentication is performed using at least one of the corrected finger print image and the generated representative finger print image.

15. A pattern input apparatus for user authentication of a device, the apparatus comprising:
a processor; and
a non-transitory computer readable medium having computer executable instructions stored thereon which, when executed by the processor, performs the following method;
providing, using a manipulation interface unit, a virtual manipulation interface to a user to input a pattern on a screen of the device; and
providing, using a pattern lock interface unit, a pattern lock interface which is displayed on the screen of the device or hidden from the screen separately from the virtual manipulation interface and provides information on the pattern which is input through the virtual manipulation interface to the user,
wherein the manipulation interface unit provides the virtual manipulation interface to the user after receiving an input to select a point on the screen of the device by the user, the virtual manipulation interface being generated in a region including the selected point, the selected point being any one node of the pattern lock interface,
wherein, when a session related with the receiving of the pattern ends, the manipulation interface unit provides an additional input interface which demands additional input to delete a trace of a pattern which is input through the virtual manipulation interface,
wherein the additional input interface is provided to the user so as to be included in a predetermined percentage or higher of the region where the virtual manipulation interface is provided, and
wherein the pattern lock interface unit provides a part of information on the pattern which is input through the virtual manipulation interface to the screen of the device.

16. The apparatus according to 15, wherein the virtual manipulation interface and the pattern lock interface are simultaneously provided on the screen of the device and present in different regions thereon.

* * * * *